US012538877B2

(12) United States Patent
Livingston et al.

(10) Patent No.: US 12,538,877 B2
(45) Date of Patent: Feb. 3, 2026

(54) VENTILATION SYSTEMS AND RELATED METHODS

(71) Applicant: 80 ACRES URBAN AGRICULTURE INC., Cincinnati, OH (US)

(72) Inventors: Patricia C. Livingston, Hamilton, OH (US); Mike Zelkind, Hamilton, OH (US); Robert Schouten, CG Delft (NL); Kees Breukel, CG Delft (NL)

(73) Assignee: 80 ACRES URBAN AGRICULTURE INC., Hamilton, OH (US)

( * ) Notice: Subject to any disclaimer, the term of this patent is extended or adjusted under 35 U.S.C. 154(b) by 64 days.

(21) Appl. No.: 18/048,091

(22) Filed: Oct. 20, 2022

(65) Prior Publication Data

US 2023/0124368 A1 Apr. 20, 2023

Related U.S. Application Data

(60) Provisional application No. 63/301,813, filed on Jan. 21, 2022, provisional application No. 63/270,002, filed on Oct. 20, 2021.

(51) Int. Cl.
*A01G 9/24* (2006.01)
*E04H 5/08* (2006.01)

(52) U.S. Cl.
CPC .............. *A01G 9/246* (2013.01); *E04H 5/08* (2013.01)

(58) Field of Classification Search
CPC .......... A01G 9/14; A01G 9/246; A01G 31/02; A01G 31/06; E04H 5/08; F24F 3/1405; F24F 2003/144; F24F 3/153; F24F 5/0003; F24F 2203/02

USPC ............................................................. 47/17
See application file for complete search history.

(56) References Cited

U.S. PATENT DOCUMENTS

| | | | |
|---|---|---|---|
| 3,012,493 A | 12/1961 | Van Ekeren |
| 3,033,097 A | 5/1962 | Phillips |
| 4,292,762 A | 10/1981 | Fogg et al. |
| 6,178,253 B1 | 1/2001 | Hendrickson et al. |
| 6,578,317 B1 | 6/2003 | Ahm |
| 6,734,973 B1 | 5/2004 | Mutters et al. |
| 8,391,565 B2 | 3/2013 | Purcell et al. |

(Continued)

FOREIGN PATENT DOCUMENTS

| | | |
|---|---|---|
| BE | 901370 A | 4/1985 |
| CN | 102528997 A | 7/2012 |

(Continued)

OTHER PUBLICATIONS

AVF+ Product Description, "AVF+ Vertical Farming," Artechno Growsystems, Pastoor Verburghlaan 20a, 2678 NE, De Lier, The Netherlands, 2018, 8 pages.

(Continued)

Primary Examiner — Brady W Frazier
Assistant Examiner — Erica Michelle Huebner
(74) Attorney, Agent, or Firm — Duane Morris LLP

(57) ABSTRACT

A ventilation system may include at least one air handler configured to supply an air flow to an enclosed grow zone and at least one heat pump coupled the at least one air handler and to at least one dry cooler. The at least one heat pump is operable in a first mode of operation in which a heat exchange fluid is cooled by the dry cooler and used to cool the air flow to remove moisture before the air handler supplies the air flow to the enclosed grow zone.

20 Claims, 29 Drawing Sheets

(56) References Cited

U.S. PATENT DOCUMENTS

| | | |
|---|---|---|
| 8,782,948 B2 | 7/2014 | Harwood et al. |
| 8,984,806 B2 | 3/2015 | Uchiyama |
| D731,917 S | 6/2015 | Stroot |
| 9,117,140 B2 | 8/2015 | Purcell et al. |
| 9,763,382 B2 | 9/2017 | Stroot et al. |
| 9,854,750 B2 | 1/2018 | Brusatore |
| 9,974,252 B2 | 5/2018 | Aykroyd et al. |
| 10,076,090 B2 | 9/2018 | Joseph et al. |
| 10,104,845 B2 | 10/2018 | Cohen et al. |
| 10,182,537 B1 | 1/2019 | Buelow |
| 10,306,847 B2 | 6/2019 | Whitcher et al. |
| D853,886 S | 7/2019 | Galonska et al. |
| 10,506,770 B2 | 12/2019 | Galonska et al. |
| 10,542,685 B2 | 1/2020 | Buelow |
| 10,750,672 B2 | 8/2020 | Buelow |
| 10,765,069 B2 | 9/2020 | Werner et al. |
| 10,801,147 B2 | 10/2020 | Harwood |
| 10,918,021 B1 | 2/2021 | Chen et al. |
| 10,939,623 B2 | 3/2021 | Miyahara et al. |
| 11,301,986 B2 | 4/2022 | Liu |
| 11,388,863 B2 | 7/2022 | Hunter et al. |
| 11,483,981 B1 | 11/2022 | Lo et al. |
| 11,483,988 B2 | 11/2022 | Bertram et al. |
| 11,968,936 B2 | 4/2024 | Ali et al. |
| 2004/0163308 A1 | 8/2004 | Uchiyama |
| 2004/0194371 A1 | 10/2004 | Kinnis |
| 2006/0272210 A1 | 12/2006 | Bissonnette et al. |
| 2007/0100900 A1 | 5/2007 | Gibbins |
| 2010/0042234 A1 | 2/2010 | May et al. |
| 2011/0041395 A1 | 2/2011 | Newbold et al. |
| 2011/0120002 A1 | 5/2011 | Pettibone |
| 2013/0255146 A1 | 10/2013 | Lehman et al. |
| 2013/0333286 A1 | 12/2013 | Billingsley |
| 2014/0115958 A1* | 5/2014 | Helene .................. A01G 9/24 47/17 |
| 2014/0137471 A1 | 5/2014 | Harwood et al. |
| 2014/0231044 A1 | 8/2014 | Duchesne et al. |
| 2014/0326801 A1 | 11/2014 | Upadhyaya et al. |
| 2015/0005964 A1 | 1/2015 | Liotta |
| 2015/0282440 A1* | 10/2015 | Shelor .................. A01G 9/246 47/17 |
| 2016/0000021 A1 | 1/2016 | Sugimoto |
| 2016/0014977 A1 | 1/2016 | Esaki et al. |
| 2016/0050862 A1 | 2/2016 | Walliser |
| 2016/0148104 A1 | 5/2016 | Itzhaky et al. |
| 2016/0288991 A1 | 10/2016 | Richardson |
| 2016/0360712 A1 | 12/2016 | Yorio et al. |
| 2017/0027112 A1 | 2/2017 | Vail et al. |
| 2017/0038749 A1 | 2/2017 | Mewes et al. |
| 2017/0118922 A1 | 5/2017 | Sherertz |
| 2017/0142912 A1* | 5/2017 | Gasmer .................. E04H 5/08 |
| 2017/0231175 A1 | 8/2017 | Galonska et al. |
| 2017/0273256 A1 | 9/2017 | Hutzel |
| 2017/0300193 A1 | 10/2017 | Ray et al. |
| 2017/0332544 A1 | 11/2017 | Conrad et al. |
| 2017/0339846 A1 | 11/2017 | Lawrence et al. |
| 2018/0007845 A1 | 1/2018 | Martin |
| 2018/0014469 A1 | 1/2018 | Buelow |
| 2018/0014486 A1 | 1/2018 | Creechley et al. |
| 2018/0027282 A1 | 1/2018 | Hirschfeld et al. |
| 2018/0035625 A1 | 2/2018 | Lindbo et al. |
| 2018/0125016 A1 | 5/2018 | Dufresne |
| 2018/0132441 A1 | 5/2018 | Harker et al. |
| 2018/0168111 A1 | 6/2018 | Yasukuri |
| 2018/0213735 A1 | 8/2018 | Vail et al. |
| 2018/0235156 A1 | 8/2018 | Blair et al. |
| 2018/0308028 A1 | 10/2018 | Zhang et al. |
| 2018/0343810 A1 | 12/2018 | Counne |
| 2018/0359937 A1 | 12/2018 | Millar |
| 2018/0359947 A1 | 12/2018 | Millar et al. |
| 2019/0082620 A1 | 3/2019 | Griffin |
| 2019/0133026 A1 | 5/2019 | Seaman et al. |
| 2019/0141911 A1* | 5/2019 | Nguyen .................. F21V 29/50 165/64 |
| 2019/0230876 A1 | 8/2019 | Lysaa |
| 2019/0259108 A1 | 8/2019 | Bongartz et al. |
| 2019/0285287 A1 | 9/2019 | Kimura et al. |
| 2019/0313588 A1 | 10/2019 | Zimmerman |
| 2019/0323253 A1 | 10/2019 | Benvie |
| 2019/0335676 A1 | 11/2019 | Solomon et al. |
| 2019/0338965 A1* | 11/2019 | O'Brian .................. F24F 11/63 |
| 2019/0380283 A1 | 12/2019 | Chong |
| 2020/0037521 A1 | 2/2020 | DeJarnette et al. |
| 2020/0093069 A1 | 3/2020 | Meews et al. |
| 2020/0214226 A1 | 7/2020 | Yukawa |
| 2020/0214228 A1 | 7/2020 | Cho et al. |
| 2020/0236871 A1 | 7/2020 | Travaglini |
| 2020/0260673 A1 | 8/2020 | Travaglini |
| 2020/0352113 A1 | 11/2020 | Canipe et al. |
| 2020/0359570 A1 | 11/2020 | Portello et al. |
| 2021/0100173 A1 | 4/2021 | Khwaja et al. |
| 2021/0133945 A1 | 5/2021 | Liu |
| 2021/0137022 A1 | 5/2021 | Fuse et al. |
| 2021/0137028 A1 | 5/2021 | Zelkind et al. |
| 2021/0352853 A1* | 11/2021 | Day .................. F24F 11/65 |
| 2022/0000045 A1 | 1/2022 | Häßler-Maraun et al. |
| 2022/0007589 A1 | 1/2022 | Binney et al. |
| 2022/0108441 A1 | 4/2022 | Burgo et al. |
| 2023/0118404 A1 | 4/2023 | Livingston et al. |
| 2023/0232760 A1 | 7/2023 | DeshPande |
| 2023/0301254 A1 | 9/2023 | DeshPande et al. |

FOREIGN PATENT DOCUMENTS

| | | | |
|---|---|---|---|
| CN | 106561347 B | 12/2019 | |
| DE | 4313581 A1 * | 10/1994 | ............... B63J 2/02 |
| EP | 3076782 B1 | 12/2017 | |
| EP | 3326452 B1 | 6/2020 | |
| EP | 3837967 A1 | 6/2021 | |
| GB | 2152205 A | 7/1985 | |
| GB | 2550319 B | 2/2021 | |
| JP | H0672344 U | 10/1994 | |
| JP | H0923762 A | 1/1997 | |
| JP | H09262027 A | 10/1997 | |
| JP | 2001016981 A | 1/2001 | |
| JP | 2001161185 A | 6/2001 | |
| JP | 2004065265 A | 3/2004 | |
| JP | 2006252105 A | 9/2006 | |
| JP | 2007209252 A | 8/2007 | |
| JP | 3156190 U | 12/2009 | |
| JP | 2012034686 A | 2/2012 | |
| JP | 2015500040 A | 1/2015 | |
| JP | 2015501157 A | 1/2015 | |
| JP | 2015213491 A | 12/2015 | |
| JP | 2016131517 A | 7/2016 | |
| JP | 2018023344 A | 2/2018 | |
| JP | 2019514145 A | 5/2019 | |
| KR | 101690113 B1 | 1/2017 | |
| KR | 102069121 B1 | 1/2020 | |
| WO | 2003041489 A1 | 5/2003 | |
| WO | 2005079557 A1 | 9/2005 | |
| WO | 2011117437 A1 | 9/2011 | |
| WO | 2012005121 A1 | 1/2012 | |
| WO | 2013113096 A1 | 8/2013 | |
| WO | 2014128746 A1 | 8/2014 | |
| WO | 2016166311 A1 | 10/2016 | |
| WO | 2016205634 A1 | 12/2016 | |
| WO | 2017024353 A1 | 2/2017 | |
| WO | 2017026390 A1 | 2/2017 | |
| WO | 2017062918 A1 | 4/2017 | |
| WO | 2017191819 A1 | 11/2017 | |
| WO | 2017205523 A1 | 11/2017 | |
| WO | 2017208906 A1 | 12/2017 | |
| WO | 2018010946 A1 | 1/2018 | |
| WO | 2018035314 A1 | 2/2018 | |
| WO | 2018136008 A1 | 7/2018 | |
| WO | 2018147728 A1 | 8/2018 | |
| WO | 2019034070 A1 | 2/2019 | |
| WO | 2019056057 A1 | 3/2019 | |
| WO | 2019077569 A1 | 4/2019 | |
| WO | 2019077571 A1 | 4/2019 | |
| WO | 2019089800 A1 | 5/2019 | |
| WO | 2019173876 A1 | 9/2019 | |
| WO | 2019176070 A1 | 9/2019 | |

(56) References Cited

FOREIGN PATENT DOCUMENTS

| WO | 2019183244 A2 | | 9/2019 | | |
|---|---|---|---|---|---|
| WO | 2019183734 A1 | | 10/2019 | | |
| WO | 2020005317 A1 | | 1/2020 | | |
| WO | WO-2020041762 A1 | * | 2/2020 | ............. | A01G 9/023 |
| WO | 2020076735 A1 | | 4/2020 | | |
| WO | 2020089479 A1 | | 5/2020 | | |
| WO | 2020092503 A1 | | 5/2020 | | |
| WO | WO-2020092506 A1 | * | 5/2020 | ........... | A01G 31/045 |
| WO | 2020112610 A1 | | 6/2020 | | |
| WO | 2020132634 A1 | | 6/2020 | | |
| WO | 2021037901 A1 | | 3/2021 | | |
| WO | 2021055257 A1 | | 3/2021 | | |
| WO | 2021072550 A1 | | 4/2021 | | |
| WO | WO-2021202827 A1 | * | 10/2021 | ........... | A01G 31/042 |
| WO | 2021219837 A1 | | 11/2021 | | |

OTHER PUBLICATIONS

U.S. Appl. No. 13/123,942, filed Apr. 13, 2021, Van Gemert, et al.

International Search Report and Written Opinion for PCT/US20/32719, dated Sep. 1, 2020, 15 pages.

International Search Report and Written Opinion for PCT/US20/60609, dated Feb. 11, 2021, 14 pages.

Partial European Search Report for European Patent Application No. 20802692.2 dated Dec. 20, 2022, 16 pages.

International Search Report and Written Opinion for PCT/US20/32218 dated Jul. 30, 2020, 11 pages.

Extended European Search Report for European Patent Application No. 20805584.8 dated Apr. 21, 2023, 7 pages.

International Search Report and Written Opinion for PCT/US22/78412 dated Feb. 2, 2023, 8 pages.

Extended European Search Report for European Patent Application No. 20802692.2 dated Mar. 27, 2023, 14 pages.

Minni, et al., "Detection of Nutrient Deficiencies in Plant Leaves Using Image Processing," International Journal of Computing Algorithm, vol. 5, No. 2, Dec. 15, 2016, pp. 84-87.

Luz, et al., "Boron Deficiency Precisely Identified on Growth Stage V4 of Maize Crop Using Texture Image Analysis," Communications in Soil Science and Plant Analysis, 49(2), 159-169.

* cited by examiner

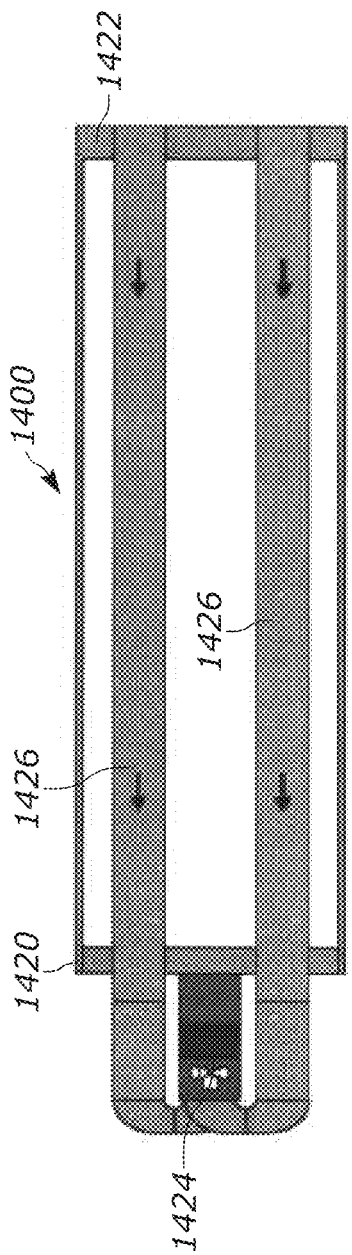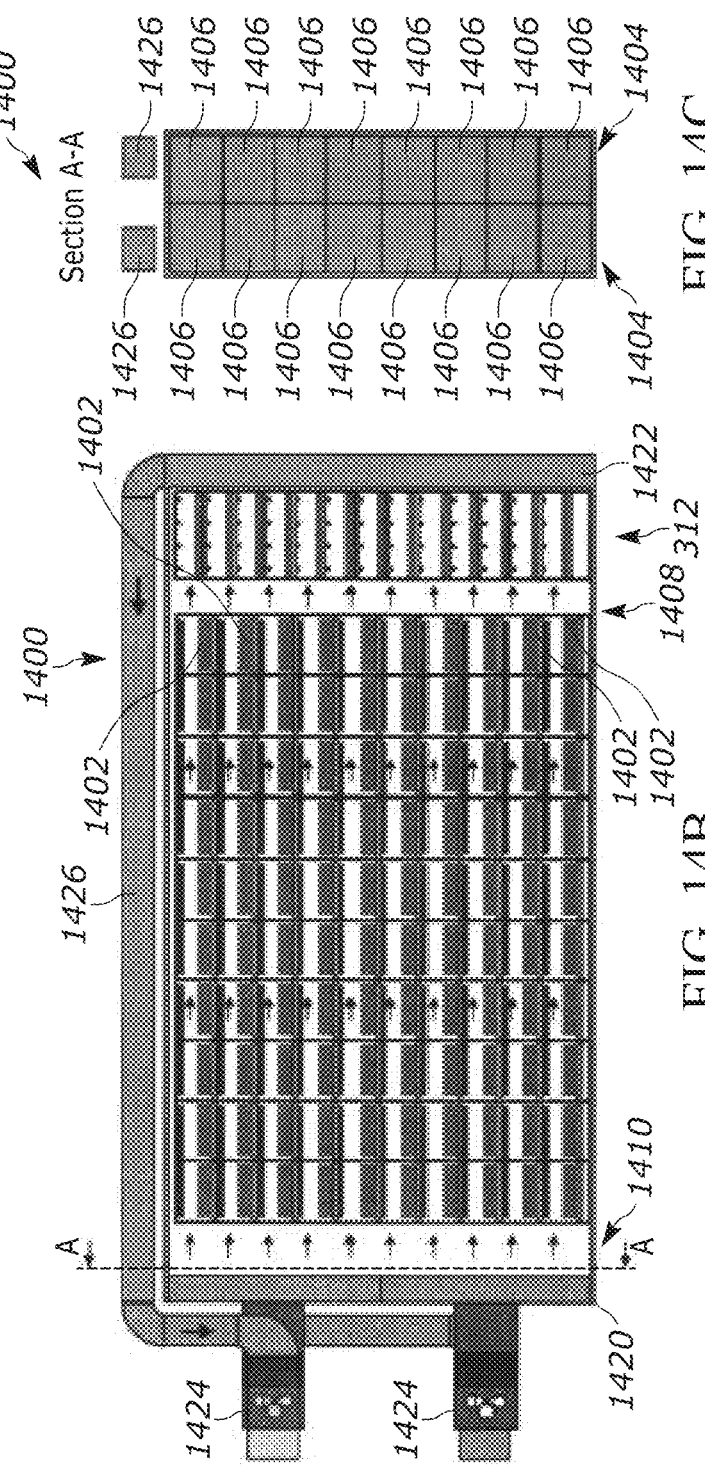
FIG. 14A  FIG. 14B  FIG. 14C

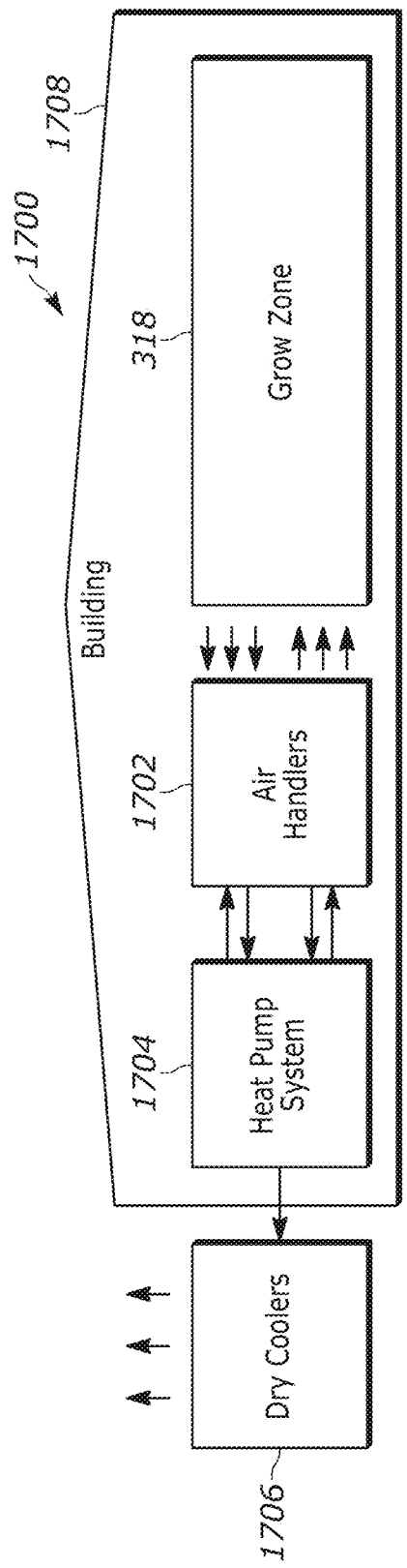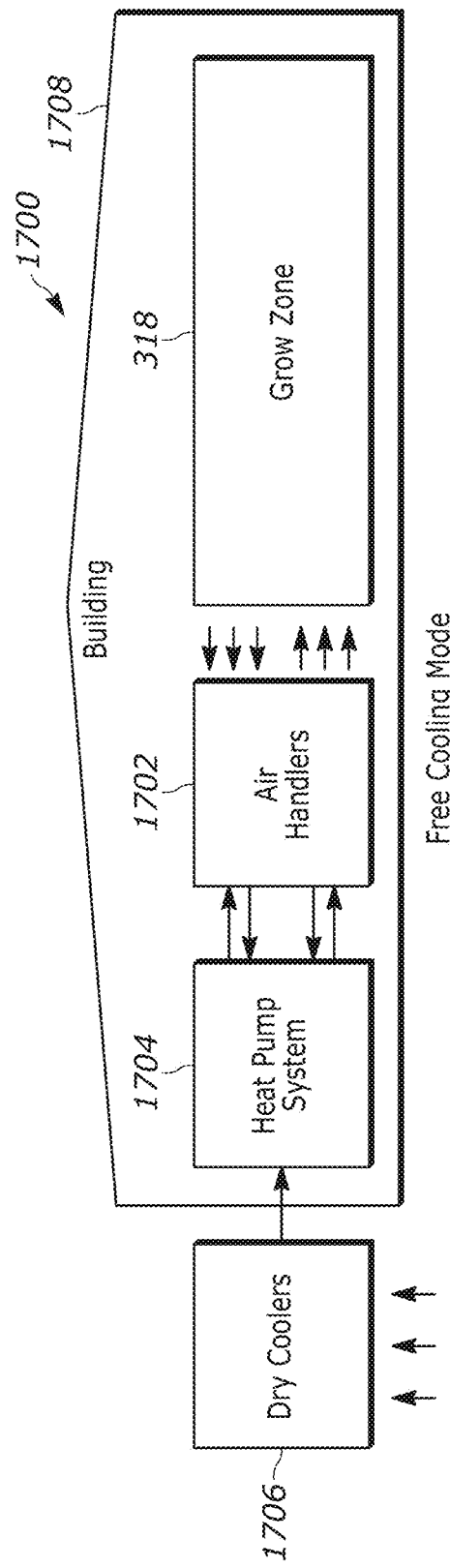

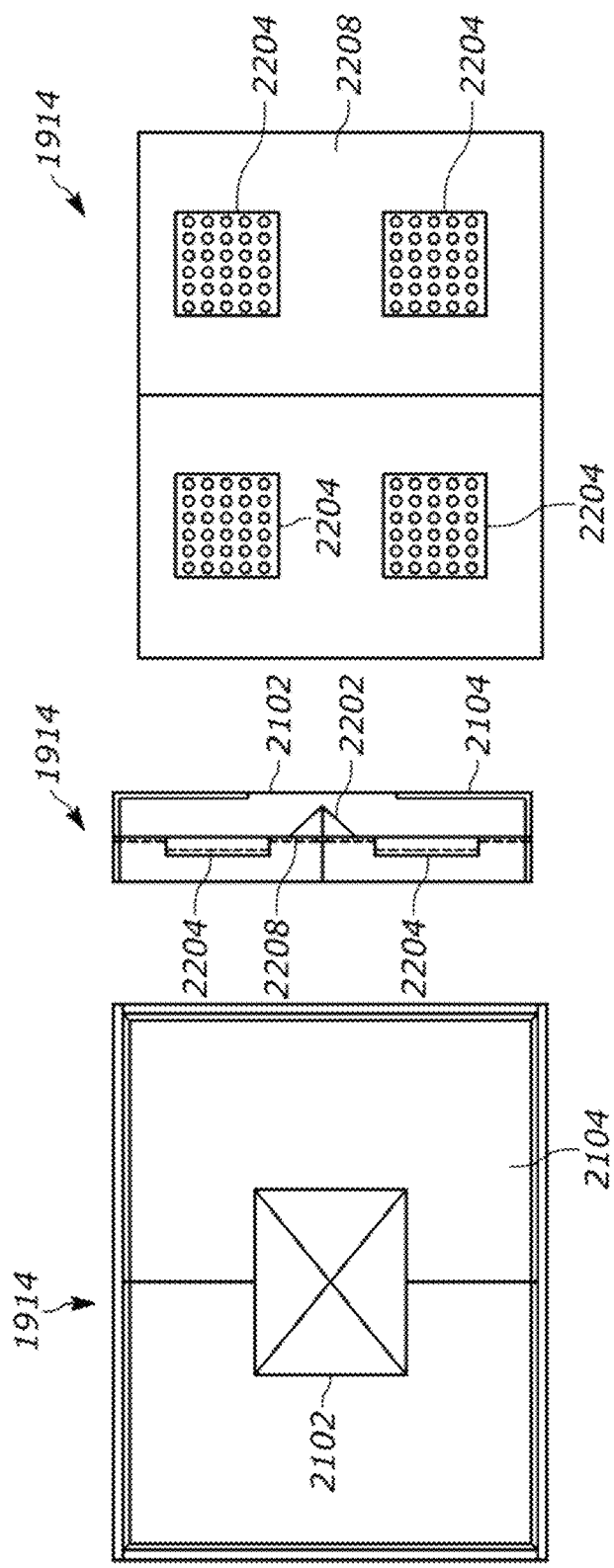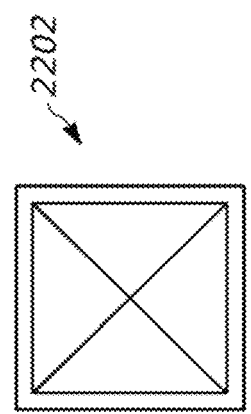
FIG. 23
FIG. 22
FIG. 24
FIG. 21

VENTILATION SYSTEMS AND RELATED METHODS

CROSS-REFERENCE TO RELATED APPLICATIONS

This application claims the benefit of U.S. Provisional Application No. 63/270,002, filed on Oct. 20, 2021 and U.S. Provisional Application No. 63/301,813, filed on Jan. 21, 2022. The entire disclosures of each of the above applications are incorporated herein by reference.

FIELD

The present disclosure relates to ventilation systems and related methods. More particularly, the present disclosure relates to ventilation system that may be used in automated indoor growing facilities, apparatuses and related methods.

BACKGROUND

This section provides background information related to the present disclosure which is not necessarily prior art.

Global food production systems need to address significant challenges in the coming decades. Finding ways to feed a growing global population whilst reducing environmental impact of agricultural activities is of critical importance. Controlled environment agriculture (CEA), which includes greenhouses and indoor farming, offers a realistic alternative to conventional production for some crops. Indoor farming allows for faster, more controlled production, irrespective of season. Further, indoor farming is not vulnerable to other environmental variability such as pests, pollution, heavy metals, and pathogens. Indoor farming can also reduce environmental impact offering no loss of nutrient, reduced land requirement, better control of waste, less production loss, reduced transportation cost, and reduced clean water usage. Therefore, indoor farming can help to address the significant challenges.

Current methods and systems for indoor farming, however, are relatively expensive to implement and do not efficiently utilize the available space within a room or enclosure for growing crops. For example, to implement an indoor farming system, an enclosure or container must be provided and thereafter configured for growing crops or plants in a controllable environment. Environmental parameters such as lighting, temperature, humidity, irrigation and airflow are controllable within an enclosure but existing systems and methods suffer from many drawbacks. One such drawback is that existing systems and methods require relatively expensive sensor and control systems. Additionally, existing systems require a large size and such space is inefficiently allocated. Furthermore, layouts of existing spaces can result in variations in airflow and other environmental conditions that result in reduced yields of usable crops. Still further, the resources used to produce the crops are inefficiently utilized resulting in higher costs and reduced yields. Therefore, there exists a need for improved systems, apparatuses and methods for indoor farming.

SUMMARY

This section provides a general summary of the disclosure, and is not a comprehensive disclosure of its full scope or all of its features.

The present disclosure provides apparatuses and methods for the indoor growing and automated growing of plants and crops. The apparatuses and methods of the present disclosure provide improvements in efficiency, yield, and cost over existing or traditional methods and apparatuses. The apparatuses and methods of the present disclosure may result in less resources that are required to yield mature plants and require less space, land, manpower while providing improved traceability, transparency and sustainability over existing or traditional apparatuses and methods.

The apparatuses and methods of the present disclosure may provide an indoor facility in which plants can be grown from seeds through mature plants that can be harvested and packaged for delivery to end users and customers. In some embodiments of the present disclosure, an indoor growing facility is provided. The facility may include one or more zones for the maturation of a plant. The zones may be enclosed or separate chambers in an indoor growing facility. The zones may include a seeding zone, a germination zone, a propagation zone, a transplanting zone, a grow zone, a harvesting zone, a mixing zone and a packing zone. Each zone can be located in a defined area or chamber in the growing facility.

In some embodiments, the grow zone is an enclosed chamber positioned inside an indoor growing facility. The grow zone can be partitioned or separated into one or more growing pathways. Each pathway can be partitioned from adjacent pathways to allow each pathway to have predetermined environmental characteristics such as airflow, temperature, humidity, light exposure, irrigation and the like.

The grow zone may include various environment controls and related equipment that provide improvements over existing or traditional farming equipment and methods. In some embodiments, the environmental controls of the growing chamber may include dual purpose dry coolers that can operate in various modes of operation to provide heating of the growing chamber and cooling of the growing chamber. Such dual modes of operation may be provided when external conditions outside of the indoor farming facility have suitable environmental conditions such as temperatures that are greater than a predetermined temperature or temperatures that are less than a predetermined temperature.

In some embodiments, the indoor growing facility may include a combined growing and propagation zone. Such a combination can take advantage of the environmentally controlled grow zone to provide environmental conditions suitable for propagation. This can eliminate or reduce the need for redundant environment controls for separated growing and propagation areas.

In other embodiments, the grow zone can include air handling equipment that may include one or more plenum assemblies and one or more return assemblies. The plenum assemblies may include one or more air supply conduits that may separate or otherwise guide air flow from a single air source to the one or more growing pathways in the grow zone. The plenum assemblies can provide an air flow that has desirable characteristics for the growing plants. The return assemblies can be positioned in the grow zone to collect and return air from the grow zone to the air handling equipment. The combination of the plenum and return assemblies can provide a stable air flow such as a laminar flow.

The air handling equipment may also include one or more air characteristic controls that may be used to measure and/or modify the characteristics of the air flow provided to the growing chamber. The air handling equipment may operate to measure and control the volumetric flow rate, the temperature, the humidity and the like of the air flow. Heat pumps, heat exchangers, and heat exchange fluids can be used to modify the characteristics of the air flow as may be desirable for optimal growing conditions.

The equipment that operates to control the conditions of the grow zone can be packaged into modular assemblies. Such modular assemblies can be fabricated at a manufacturing location and then delivered to a building site of the indoor growing facility. In this manner, the indoor growing facility can be easily assembled. Such modular assemblies also allow a capacity of the indoor growing facility to be increased or to be scaled to various sizes as may be desirable or allowed by local building sites and/or geographic restrictions.

In some embodiments of the present disclosure, an indoor growing facility is provided. The indoor growing facility may include an enclosed structure defined by one or more first walls and a growing shell defining a grow zone positioned in the enclosed structure. The growing shell may be defined by one or more second walls. The indoor growing facility may also include at least one environmental control component positioned inside the enclosed structure and outside the growing shell.

In one aspect, the one or more first walls may separate an interior space of the indoor growing facility from an ambient external environment.

In another aspect, the indoor growing facility may also include a propagation zone positioned adjacent the grow zone in the growing shell.

In another aspect, the propagation zone may include a first growing structure that includes a plurality of rows for holding plants during a first stage of plant growth and the growing zone may include a second growing structure that includes a plurality of rows for holding plants during a second stage of plant growth. The first growing structure may be separated from the second growing structure by a transportation lane in the growing shell.

In another aspect, the indoor growing facility may also include a germination zone positioned proximate the propagation zone in the enclosed structure and outside the growing shell.

In another aspect, the indoor growing facility may also include a harvesting zone positioned proximate the grow zone in the enclosed structure and outside the growing shell.

In another aspect, the indoor growing facility may also include a transplanting zone configured to receive germinated plants from the germination zone and to provide transplanted plants to the propagation zone.

In another aspect, the at least one environmental control component may include an air handling unit and a heat pump.

In another aspect, the at least one environmental control component may be coupled to a dry cooler positioned outside the enclosed structure in an ambient environment.

In some embodiments of the present disclosure, a growing structure for use in an indoor growing facility is provided. The growing structure may include a plurality of vertical barriers and a plurality of horizontal barriers defining an array of grow pathways and a plenum wall positioned on a first side of the growing structure configured to supply an air flow into each of the grow pathways. The growing structure may also include a return wall positioned at a second side of the growing structure opposite to the first side configured to return air from the growing structure to the first side.

In one aspect, the growing structure may also include a loading lane positioned adjacent the array of grow pathways and a loading elevator positioned in the loading lane, wherein the loading elevator is configured to move in the loading lane to selectively load plants into one grow pathway of the array of grow pathways.

In another aspect, the loading lane may be positioned between the array of grow pathways and the return wall.

In another aspect, the growing structure may include an unloading lane positioned adjacent the array of grow pathways and an unloading elevator positioned in the unloading lane, wherein the unloading lane is positioned on a side of the array of grow pathways opposite to the loading lane.

In another aspect, the growing structure may include a propagation zone positioned between the loading zone and the return wall. The propagation zone may include a plurality of rows for supporting plants during a propagation stage of growth.

In another aspect, the growing structure may also include at least one air handler in communication with the plenum wall to provide the air flow.

In another aspect, the plenum wall may be coupled to a distribution assembly to separate air flow from an air handler into each grow pathway of the array of grow pathways.

In another aspect, the plenum wall may include a plurality of manifolds, each manifold of the plurality of manifolds positioned adjacent to one another to form the plenum wall.

In another aspect, each manifold of the plurality of manifolds may include a plurality of vents through which air flow exits each manifold. Each vent of the plurality of vents may be aligned with one grow pathway of the array of grow pathways.

In another aspect, each manifold of the plurality of manifolds may include a diverter positioned centrally between the plurality of vents. The diverter may have a sloped surface to guide airflow toward each vent of the plurality of vents.

In another aspect, the distribution assembly may include a plurality of channels coupled between the air handler and the plenum wall to separate air flow, wherein a number of the plurality of channels corresponds to a number of the plurality of manifolds. Each channel of the plurality of channels may be coupled to one manifold of the plurality of manifolds.

In some embodiments of the present disclosure, an environmental control apparatus for use with an indoor growing facility is provided. The environmental control apparatus may include at least one air handler configured to supply an air flow to an enclosed grow zone and at least one heat pump coupled to the at least one air handler and to at least one dry cooler. The at least one heat pump may be operated in a first mode of operation in which a heat exchange fluid is cooled by the dry cooler and used to cool the air flow to remove moisture before the air handler supplies the air flow to the enclosed grow zone.

In one aspect, the at least one air handler and the at least one heat pump are positioned in an outer structure enclosing the grow zone. The outer structure may also separate the grow zone, the at least one air handler, and the at least one heat pump from an ambient external environment.

In another aspect, the at least one dry cooler is located outside the outer structure in the ambient external environment.

In another aspect, the at least one heat pump may be operated to heat the air flow after moisture is removed before the air flow is supplied to the grow zone.

In another aspect, the ventilation system may also include a cold fluid loop and a warm fluid loop each containing the heat exchange fluid. The cold fluid loop and the warm fluid loop fluidly may be coupled to the at least one air handler and to the at least one heat pump to cool and heat the air flow, respectively.

In another aspect, the at least one heat pump may be operated in a second mode of operation in which heat exchange fluid from the warm fluid loop is mixed with the heat exchange fluid in the cold fluid loop to maintain a temperature of the air flow above a dew point.

In another aspect, the air flow is not heated before the air flow is supplied to the grow zone in the second mode of operation.

In another aspect, the moisture that may be removed from the airflow in the first mode of operation is supplied to an irrigation system coupled to the grow zone.

In another aspect, the first mode of operation operates to remove moisture to maintain a predetermined humidity level in the grow zone.

In another aspect, the second mode of operation operates at a lower energy consumption than the first mode of operation.

In some embodiments of the present disclosure, an indoor growing facility is provided. The indoor growing facility may include a climate control apparatus configured to produce a plurality of streams of airflow. Each stream of airflow may have predetermined climate conditions. The indoor growing facility may also include a plurality of growing pathways wherein each growing pathway of the plurality of growing pathways is isolated from an adjacent growing pathway to allow introduction of a stream of airflow of the plurality of streams of airflow into each growing pathway.

In one aspect, each stream of airflow of the plurality of streams of airflow may have substantially similar climate conditions.

In another aspect, the predetermined climate conditions comprise air speed, temperature, and humidity.

In another aspect, the climate control apparatus may include an air handler coupled to a distribution assembly. The distribution assembly may include a plurality of channels to separate and divide an initial airflow into the plurality of streams of airflow.

In another aspect, the distribution assembly may include a plurality of manifolds coupled to the plurality of channels. Each manifold of the plurality of manifolds may include at least one vent configured to introduce one stream of airflow to one growing pathway.

In another aspect, the climate control apparatus may include a return system coupled to the air handler that is configured to return the plurality of streams of airflow from each of the growing pathways to the air handler.

In another aspect, the airflow may be modified after the airflow is returned from the plurality of growing pathways to have the predetermined climate conditions before the airflow is re-introduced into the plurality of growing pathways.

In another aspect, each stream of airflow of the plurality of streams of airflow is a laminar flow.

In another aspect, the plurality of growing pathways are defined by a plurality of vertical barriers and a plurality of horizontal barriers.

In another aspect, the climate control apparatus is separated from the plurality of growing pathways by an enclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 14A is a top view of an example grow zone structure showing example air handling paths.

FIG. 14B is a side view of the example grow zone structure of FIG. 14A showing multiple rows and example air handling paths.

FIG. 14C is a side sectional view along cut plane A-A indicated on FIG. 14B.

FIG. 17A is a schematic illustration showing an example grow room and environmental controls in a standard operating mode.

FIG. 17B is a schematic illustration showing the example grow room and environmental controls of FIG. 17A in a free cooling mode.

FIG. 21 is an end view of an entry side of an example air supply plenum.

FIG. 22 is a side sectional view of the air supply plenum of FIG. 21.

FIG. 23 is an end view of an exit side of the air supply plenum of FIG. 21.

FIG. 24 is an end view an example diverter included in the air supply plenum of FIGS. 21-23.

Corresponding reference numerals indicate corresponding parts throughout the several views of the drawings.

DETAILED DESCRIPTION

Figure 1:
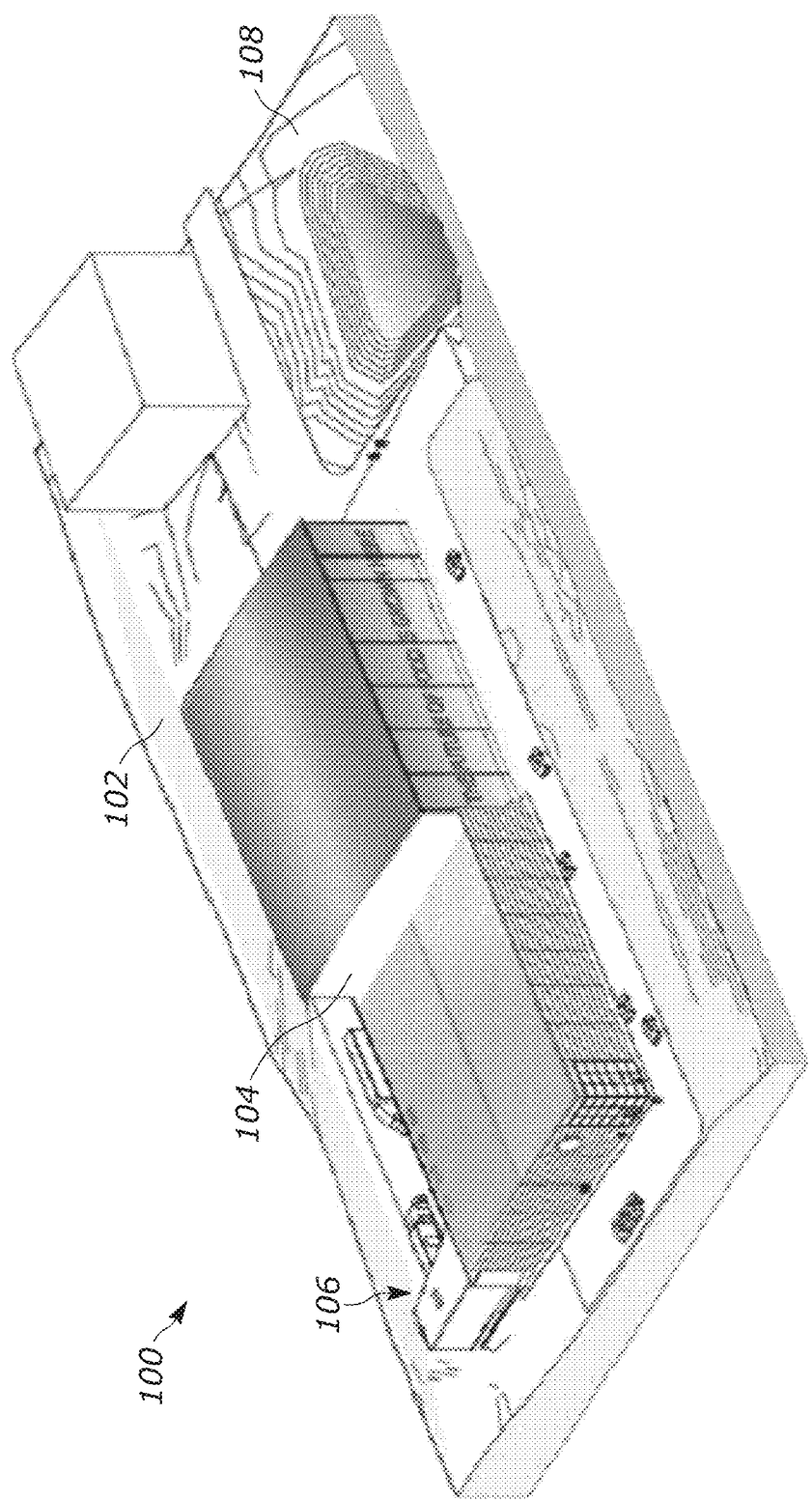
FIG. 1 is an isometric view of an example indoor growing facility in accordance with the present disclosure.

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The present disclosure is directed to indoor growing facilities, growing apparatuses and related methods. The facilities, apparatuses and methods of the present disclosure are improvements over existing or traditional growing and farming equipment and processes. As shown in FIG. 1, an example indoor growing facility 100 is shown. The growing facility 100 can be located on a suitable building site 102. The building site can be located in various suitable geographic locations and can have various sizes. The example facility 100 can include a footprint that includes an enclosed building that can include floor space to allow for finished plant products to be grown to maturity from seeds and packaged for delivery to a customer. As shown, the facility can include an enclosed structure 104 with a loading dock 106.

Raw materials such as seeds, growing medium, fertilizers and the like can be delivered to the loading dock 106. The entire growing process can be accomplished in the structure 104. When mature plants are grown, the plants can be harvested and packaged for delivery to a customer. The packaged plant goods can be delivered from the same loading dock 106 at which the raw materials are received. The growing process can be carefully monitored and controlled to allow the plants to be grown to maturity using less resources than existing or traditional farming and growing methods. In addition, the plants can be grown in less time that traditional farming techniques. Since the plants and their growing conditions are known and recorded from seed to maturity, the quality and characteristics of the plants are known and can be traced back to a lot of seed.

The building site 102 may include other features or characteristics. For example, the building site 102 may include a reservoir 108. The reservoir 108 can be used to collect and/or hold rainwater than can be used or incorporated into the growing process after suitable quality control is performed such as filtration and/or removal of contaminants.

As can be appreciated, the growing facility 100 can be a large facility. The principles and teachings of the present disclosure can be used in various facilities having various sizes. The various apparatuses, structures and methods described herein can be modified to be located in various types of growing facilities having various sizes.

Figure 2:
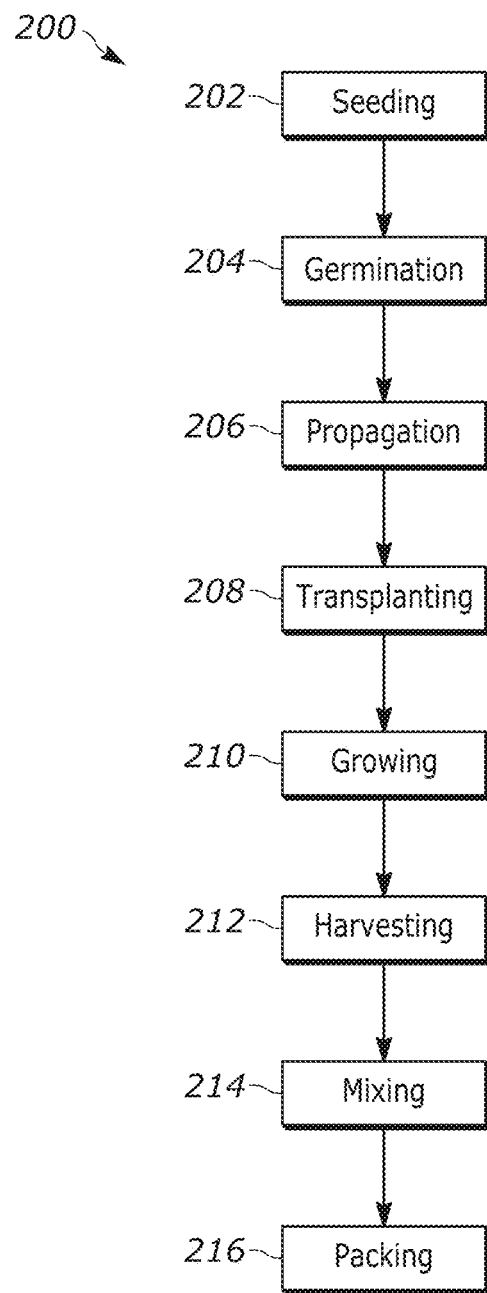
FIG. 2 is a flow chart showing an example method of growing plants in accordance with the present disclosure.

Turning now to FIG. 2, an example growing process 200 is shown. The growing process 200 may be used in the growing facility 100. As previously described, the growing facility 100 is sized and arranged to allow efficient performance of the process 200 from seeding 202 to packing 216. It should be appreciated, however, that some facilities may be arranged or sized to allow performance of one or more of the steps of the process 200.

The process 200 begins at step 202. At step 202, seeding occurs. At seeding, seeds of a predetermined plant variety are placed in a suitable growing medium. In one example, the seeds are placed in a suitable prepackaged growing medium. One such prepackaged growing medium tray is the Quick Plug. Such a medium provides for the healthy germination and growing of the plant variety. Growing medium can also be prepared at the facility according to a specified recipe(s) and arranged on a tray at specific spaced distances. The plant medium may be placed in one or more openings in a tray that can hold one or more seeds and/or plants. After the plant medium is placed, one or more seeds can be deposited on or in the medium. There are various known techniques for depositing seeds on a medium or into the medium at a predetermined depth beneath the surface.

The process 200 then moves to step 204. At step 204, germination occurs. At germination, the seeds and growing medium are placed in an environment having predetermined germination conditions. Germination can occur in two to three days for example. For certain plant varieties, germination may take other periods of time. At germination, the seed husk breaks open and the plant begins to grow. Once the seed husk breaks open, the process moves to step 206. In the indoor growing facility 100, a germination chamber can be provided in which the seeds are held in predetermined conditions.

At step 206, propagation occurs. Propagation refers to the early stage of plant development. The plants during this early stage of growing may need somewhat different environmental conditions than are required during later growing stages. In one example, the trays of germinated seeds can be loaded into benches and moved from the germination chamber to a propagation chamber. As will be described, the propagation chamber may be combined with a grow zone in which the plants are grown to maturity. In other examples, the propagation chamber can be separate from the grow zone. Once in the propagation chamber, the plants are allowed to grow until the plants have predetermined characteristics that make the plants suitable for growing to maturity. In some examples, the stage of propagation can take about ten to twelve days. In other examples and for other plant varieties, the stage of propagation can take other lengths of time.

At step 208, transplanting occurs. The step of transplanting 208 can include a process of moving the plants from a tray into a float. This process generally includes moving the plants from a dense arrangement of plants to an arrangement in which the plants are spaced further apart from one another. During germination and propagation, the seedlings and plants can be positioned closer together because the plants are small enough such that they do not interfere with one another or inhibit the growth of neighboring plants. Once the plants reach a certain size (at the conclusion of propagation 206, for example) the plants need to be moved further apart to allow the plant to grow to reach a suitable mature size. Thus, the propagated plants are transplanted to a growing container that has suitable spacing to allow the plants to reach a mature size. In order to transplant the plants, the trays can be removed from the propagation chamber. The plants and growing medium can be removed from the propagation trays and re-inserted or re-deposited into a float. The float can have suitable spacing for the growing of the plants.

The process 200 can continue to step 210. At step 210, the plants can be grown. The growing step 210 can include the growing of the plants to a mature size at which time the mature plants are ready for harvesting. During step 210, the plants can be moved into a grow zone, as will be further described, in which the environmental conditions can be controlled and monitored to efficiently grow the plants to a mature size. The grow zone can have suitable structures and elements to provide lighting, air flow, irrigation, nutrients, and the like to be provided. The plants can be moved in their floats and positioned into benches. The float and bench assemblies can then be moved into the grow zone using automatic conveyance equipment in some examples. The plants in their floats can be transported and moved through the grow zone. In the grow zone, the plants can be subjected to various desirable conditions that may be desirable according to the particular stage of growing or development. Once fully mature, the plants can be removed from the grow zone. In alternative embodiments, the process can proceed without transplanting. In such alternative embodiments, the process moves directly from the propagation step 206 to the growing step 210, eliminating the transplanting step 208. A different tray/growing float design may be preferred in such alternative embodiments.

Once the plants have grown to maturity, the process can move to step 212. At step 212, harvesting occurs. At harvesting 212, the plants are removed from the growing medium and/or from the growing floats. The desirable parts of the plants are collected for packaging and the undesirable parts can be disposed of, composted or otherwise recycled. In some examples, the plants can be harvested using automatic cutting, shearing, scraping or collecting equipment. While not shown, the growing containers, floats, trays, and/or benches can be cleaned and reused to grow new plants using the same process. Some plants or crops, such as berries and fruits, can be placed back into the grow zone for second or subsequent grow cycles as the same plant can produce multiple harvests.

At step 214, mixing may occur. At mixing, various types of plants can be mixed together. For example, a plant product may include a predetermined mixture of different plant varieties for a particular salad or greens mix. At step 214, the various mature and harvested plants can be mixed together into the predetermined mixes.

At step 216, packaging may occur. The plant products, either individually or in mixtures as previously described, can be combined into containers, bags, boxes or other receptacles. Once the plant products are packaged, the plant products can be shipped or delivered to customers or other plant processing facilities.

As can be appreciated, the process 200 can be continuously and automatically performed. In some examples, the process 200 is continuously performed using the facility 100 so that plants in various stages of development are moving through the various zones and chambers from seeding 202 to packing 216. In this manner, the indoor farming facility 100 can continuously produce plant products rather than being limited to specific growing seasons or by variations in weather or other external environmental conditions. Furthermore, since the process is performed indoors, the process can be performed in any geographic location and in closer proximity to/within urban areas or in areas that otherwise would not support farming of many plant varieties.

Figure 3:
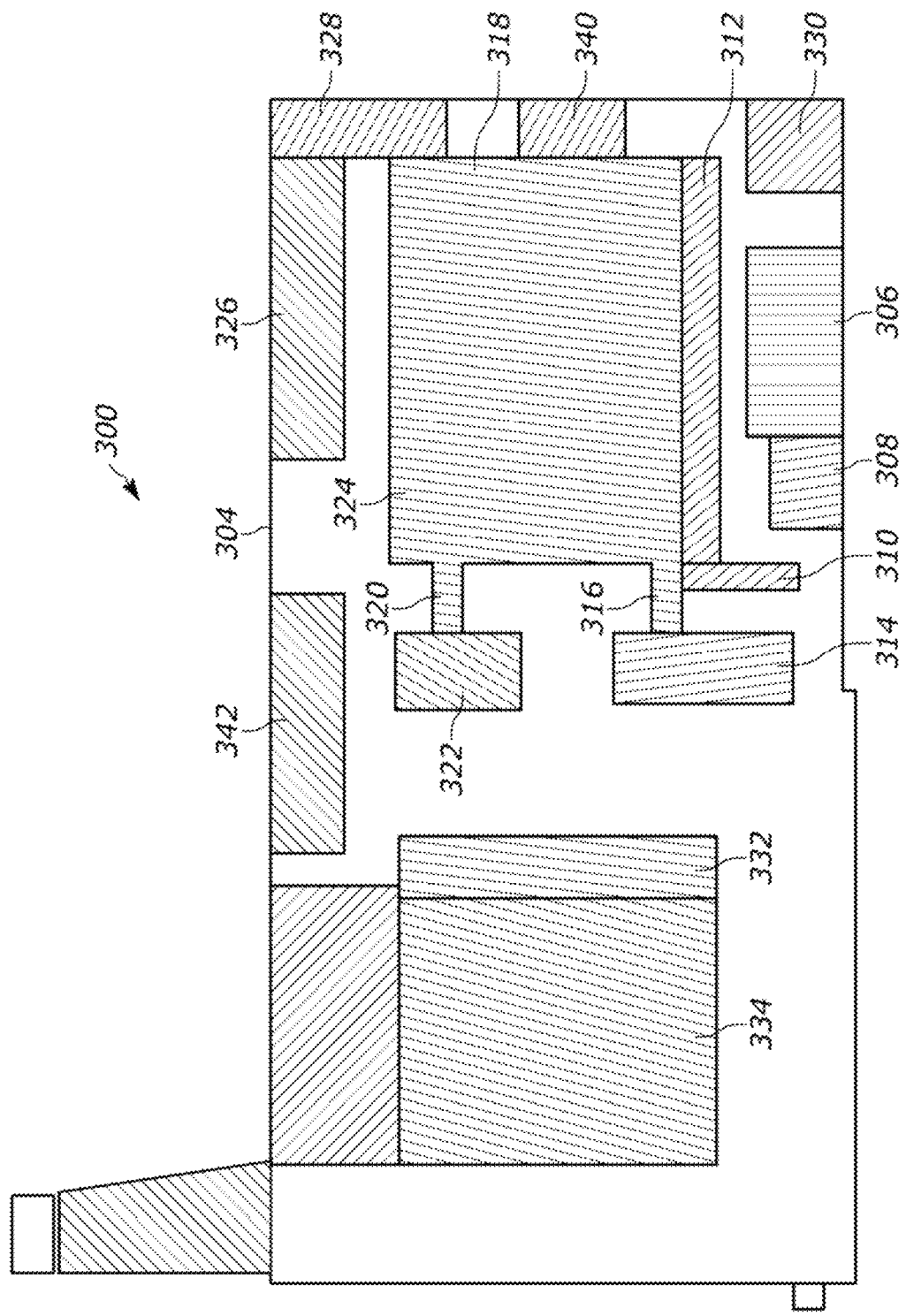
FIG. 3 is a plan view of an example floor layout for an example indoor growing facility of the present disclosure.

As shown in FIG. 3, an example layout of an indoor growing facility 300 is shown. The layout can be a plan view of the indoor growing facility 100 shown in FIG. 1. The layout illustrates the footprint of various rooms, chambers or zones in the indoor growing facility. The vertical farm 300 will be explained with reference to the growing process 200 previously described. It should be appreciated, however, that other layouts and other facilities can also be used.

The vertical farm 300 can be enclosed within one or more buildings and can include an external wall 304 that can be constructed to enclose the various zones of the indoor growing facility. The vertical farm 300 may include a seeding zone 306. The seeding zone 306 can be configured as an enclosed room in which the seeding step 202 can be performed. The germination zone 308 can be positioned adjacent or proximate to the seeding zone 306. The germination zone 308 can be an enclosed, environmentally controlled room in which the germination step 204 can be performed.

The vertical farm 300 may also include a propagation loading zone 310. The propagation loading zone 310 may include one or more conveyance assemblies such as conveyors, racks, rail systems or the like. The trays of plants from the germination zone 308 can be moved into or onto the propagation loading zone 310. The trays can then be moved from the propagation loading zone 310 into the propagation zone 312. This process can be performed automatically using suitable conveyance devices such as robots, conveyors, pneumatics, and the like. The propagation zone 312 can be combined as part of the enclosure that makes up the grow zone 318. Thus, the propagation zone 312 can be environmentally controlled to have predetermined propagation climate conditions such as humidity, air flow, temperature, lighting, irrigation and the like.

Figure 7:
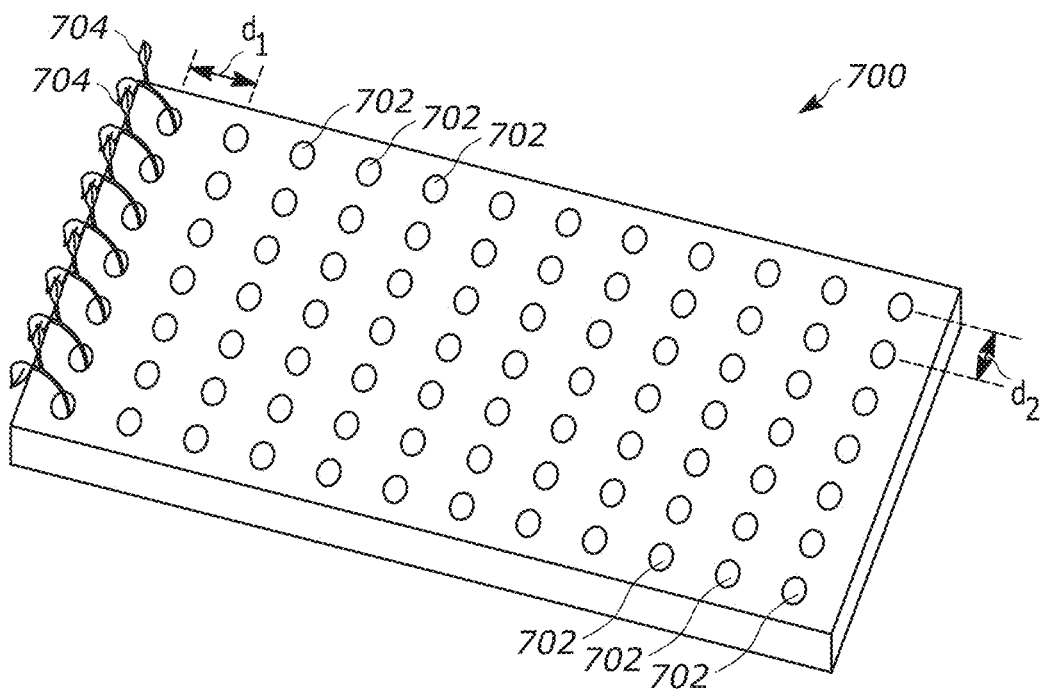
FIG. 7 is an isometric illustration of an example tray used during a germination and/or propagation stages of the growing processes of the present disclosure.
Figure 8:
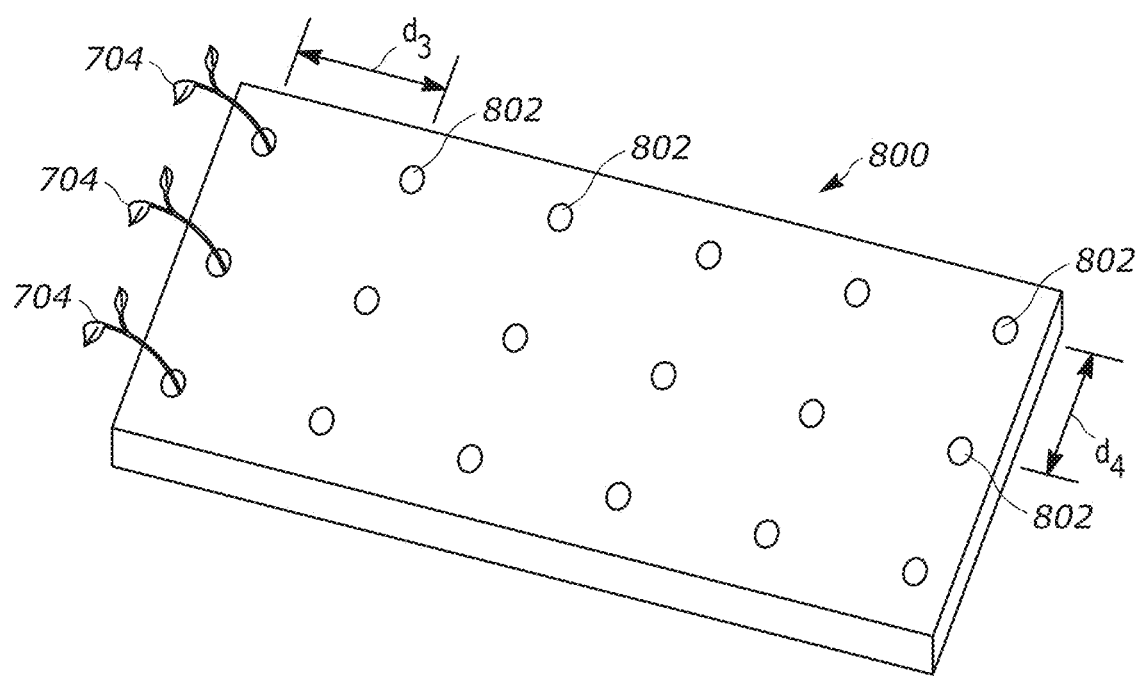
FIG. 8 is an isometric illustration of an example float used during a growing stage of the growing processes of the present disclosure.

The vertical farm 300 may also include a transplanting zone 314. The transplanting zone 314 may be located adjacent or proximate to the propagation loading zone 310. In this manner, the movement of the plants from the propagation zone 312 to the transplanting zone 314 is simple and does not require excessive movement of the propagated plants. The step 208 of transplanting can occur in the transplanting zone 314. The plants can be transplanted from a tray to a float in the transplanting zone 314. The transplanting zone 314 may include an automatic transplanting apparatus that can remove plants from the propagation trays and deposit the plants in the growing floats. An example propagation tray 700 and an example growing float 800 are shown in FIG. 7 and FIG. 8, respectively. The growing tray can have increased spacing and/or a decreased density of plants.

As stated above, in alternative embodiments, the vertical farm 300 can be designed without a transplanting zone 314 or transplanting equipment. In such embodiments, plants can move directly from the propagation zone 312 to the growing zone 318.

The vertical farm 300 can also include a growing loading zone 316. The growing loading zone is a region of the layout of the growing facility in which the floats of plants can be inserted or loaded into the grow zone 318. The growing loading zone 316 can include conveyors, racks, rail systems, ramps, robots, automated moving systems, or other conveyance devices to move the floats into the grow zone 318. The loading equipment can be automatically controlled to deliver floats and/or plants into the grow zone in a predetermined manner so that the plants are positioned in a desired number and/or sequence in the grow zone 318. The floats that include the propagated plants may be installed or inserted into benches that can hold multiple floats. The benches can also be conveyed moved or otherwise loaded in the growing loading zone 316 into the grow zone 318. The growing loading zone 316 can be positioned adjacent to the transplanting zone 314 and adjacent to the grow zone 318.

The grow zone 318 can be positioned to accept the plants that may be positioned in the floats and/or benches. The grow zone 318 is a large enclosure that allows the growing plants to be subjected to environmentally controlled conditions. The controlled environment can improve the growth rate and health of the plants. The controlled climate conditions can also use less resources than traditional farming methods. The grow zone 318 can include a growing structure that includes various elements, as will be described further below, to create separate growing pathways or chambers within the grow zone 318 that can further optimize and improve the environmental characteristics or specified climate conditions such as light, humidity, air flow, temperature, irrigation and the like. The grow zone 318 can be constructed of steel and wrapped in insulated panels to maintain the climate within the grow chamber. The insulating panels may be 4-inch insulated panels in one example.

The plants in the floats that are loaded into the grow zone 318 may move within the grow zone 318 as they mature. In the example shown, the plants may move toward the growing unloading zone 320 as they mature. After the plants are fully matured, the plants can be automatically unloaded from the grow zone 318. The growing unloading zone 320 can include conveyors, racks, rail systems, elevators, robots, and the like that can unload the floats and/or benches of plants from the grow zone 318.

The unloaded plants can move from the growing unloading zone 320 to the harvesting zone 322. The harvesting step 212 of the process 200 previously described can be performed in the harvesting zone 322. For example, the plants can be removed from the floats and the desirable portions of the plants that are used to produce plant products can be cut, trimmed, scraped or otherwise separated from the undesirable portion. The desirable portions of the plants are then collected, while the undesirable parts of the plants and/or the growing medium can be deposed of, composted, or otherwise recycled. The harvesting zone 322 may include, for example, a float scraping assembly that can be used to remove the plants from the floats.

The vertical farm 300 may also include a work-in-process zone 332. The work-in-process zone 332 can be used for various tasks involving the collected plant material after harvesting. The work-in-process zone 332 can be used, for example, to perform the mixing step 214 previously described. In other examples, the work-in-process zone 332 can be used to perform other tasks. The vertical farm 300 may also include a product cooling area, which can be an active cooling area for cooling the harvested crops prior to packaging. The active cooling area may employ a vacuum cooling process.

The vertical farm may also include the packing zone 334. The packing zone 334 may include various workstations and/or packing equipment that can be used to perform the packing step 216. In various examples, the packing zone 334 can include equipment for mixing, weighing, sorting, detecting product characteristics, bagging, boxing, sealing, cooling or making atmospheric modification as may be desired to package, preserve and prepare the plant products for shipment to customers or other processors.

The vertical farm 300 may include other systems or equipment that may serve or provide inputs to the other zones in the vertical farm 300. As further shown, the vertical farm 300 may include an air handler zone 324. The air handler zone 324 is positioned along one side of the grow zone 318 and may include one or more air handling units or other equipment that provides air flow to the grow zone. The air handler zone 324 may be positioned inside the outer structure of the vertical farm 300 or outside the grow zone 318.

The vertical farm 300 may also include one or more irrigation systems to provide water having predetermined characteristics to the various zones. The vertical farm 300 may include a first irrigation system 326 and a second irrigation system 328 that can serve one or more portions of the grow zone 318. The first irrigation system 326 and the second irrigation system 328 can include filtration systems, sanitation systems, nutrient additive systems, other purification systems, and recycling systems to provide water to the plants in the grow zone 318. The vertical farm 300 may also include a propagation irrigation system 330 that can include similar systems to that of the first irrigation system 326 and the second irrigation system 328 but can operate to deliver water and/or nutrients to the propagation zone 312. The vertical farm 300 may also include a fresh water system 340 that can operate to process, filter and/or purify fresh water that may need to be added into the closed irrigation systems, such as first irrigation system 326, second irrigation system 328 and/or propagation system 330.

As further shown, the vertical farm 300 may also include washing zone 342. The washing zone 342 may include various pieces of equipment that can be used to wash the various pieces of equipment used in the growing process. Such elements that may need washing include the trays, floats or benches used during propagation or growing or other growing equipment, and removable components of the harvesting equipment.

Figure 4:
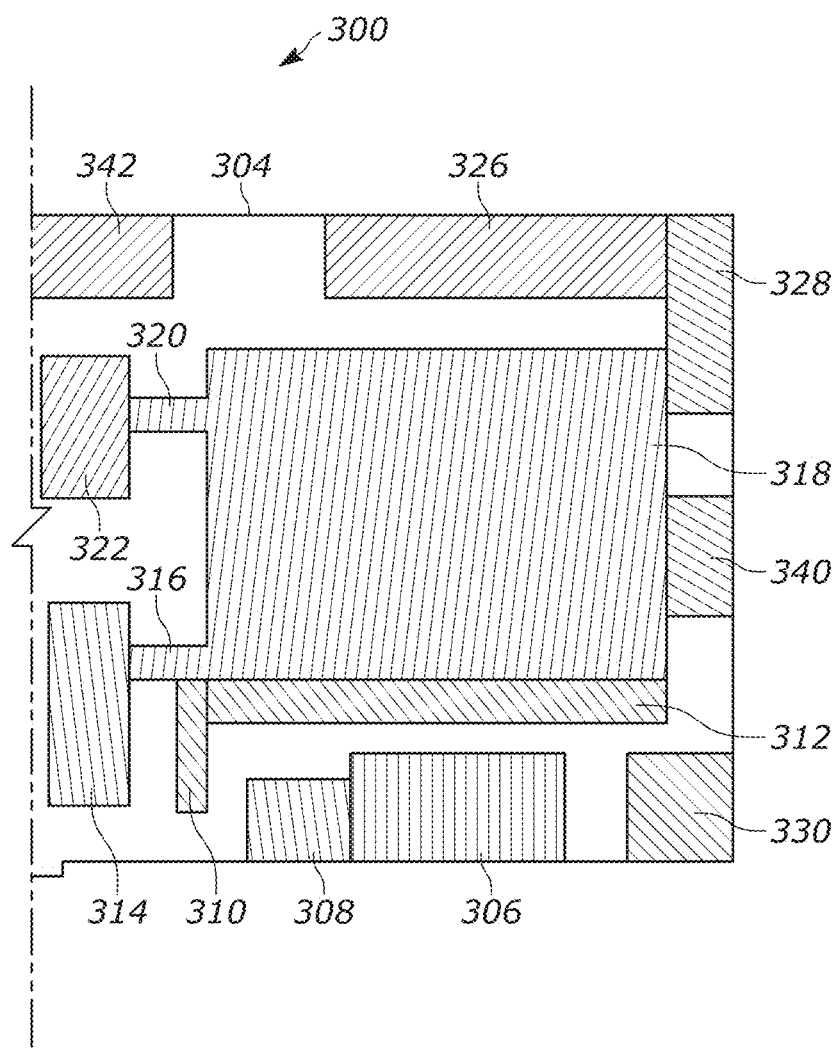
FIG. 4 is an enlarged plan view of a portion of the floor layout of FIG. 3.
Figure 5:
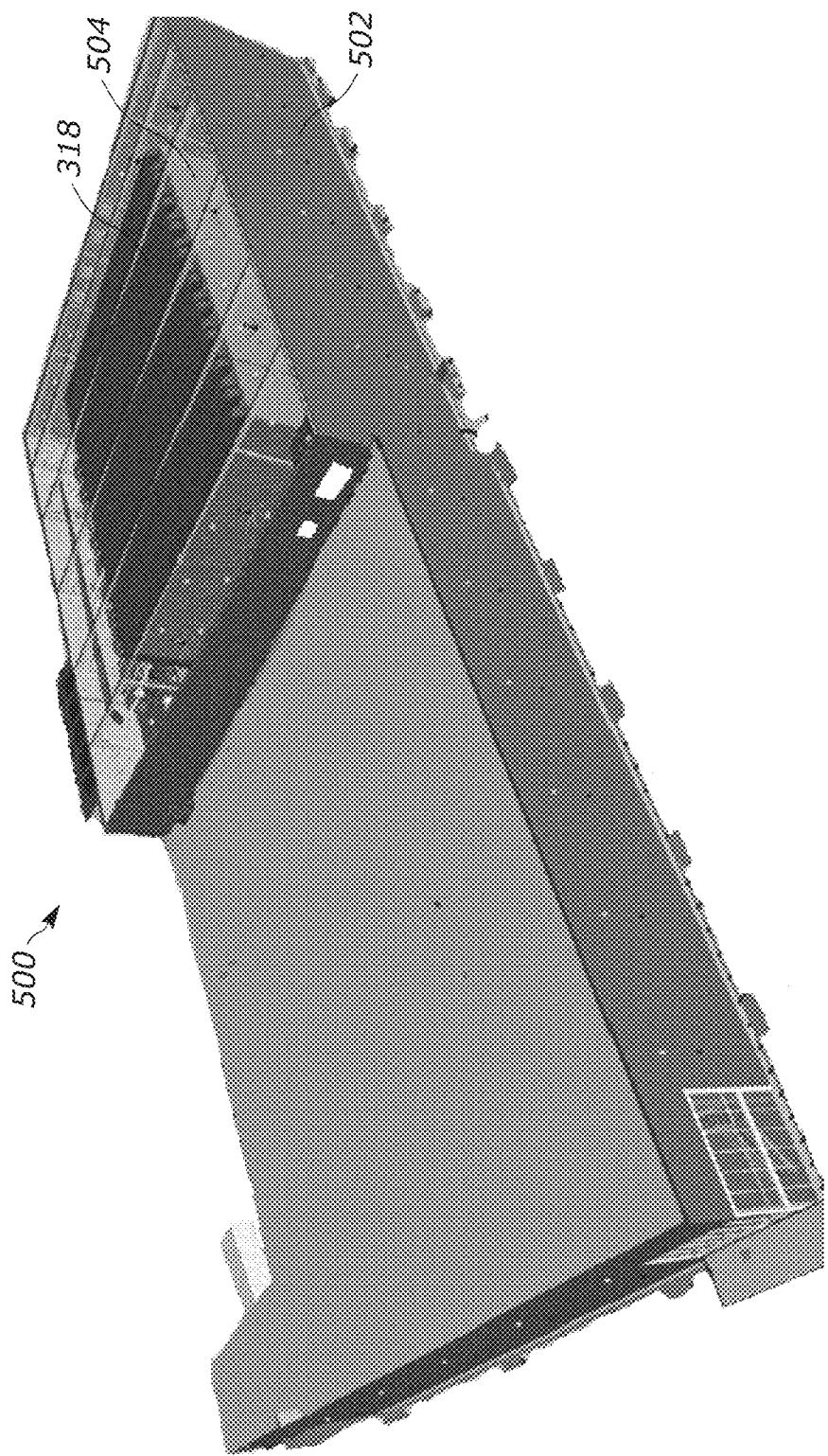
FIG. 5 is an isometric view of the example indoor growing facility with the floor layout of FIG. 3.

Referring now to FIG. 5, an illustration of the indoor growing facility 500 is shown. The example shown may have a similar layout the vertical farm 300 shown in FIGS. 3 and 4. In the figure, a portion of the roof of the facility 500 is removed to illustrate the location of the grow zone 318 inside the outer building 502. The grow zone 318 comprises a growing shell or growing module 504, which is located within and enclosed by outer building 502. The climate control systems and equipment of vertical farm 300 can be located inside a protected environment within outer building 502, but outside the grow zone 318. In other methods and farming structures, the environmental control equipment is often located inside the grow zone. Locating the climate control equipment within the grow zone can make the environmental conditions of the grow zone more difficult to control and can introduce contaminants into the grow zone. The shell-inside-a-shell arrangement of the present disclosure is an improvement over traditional farming and/or growing arrangements.

Figure 6:
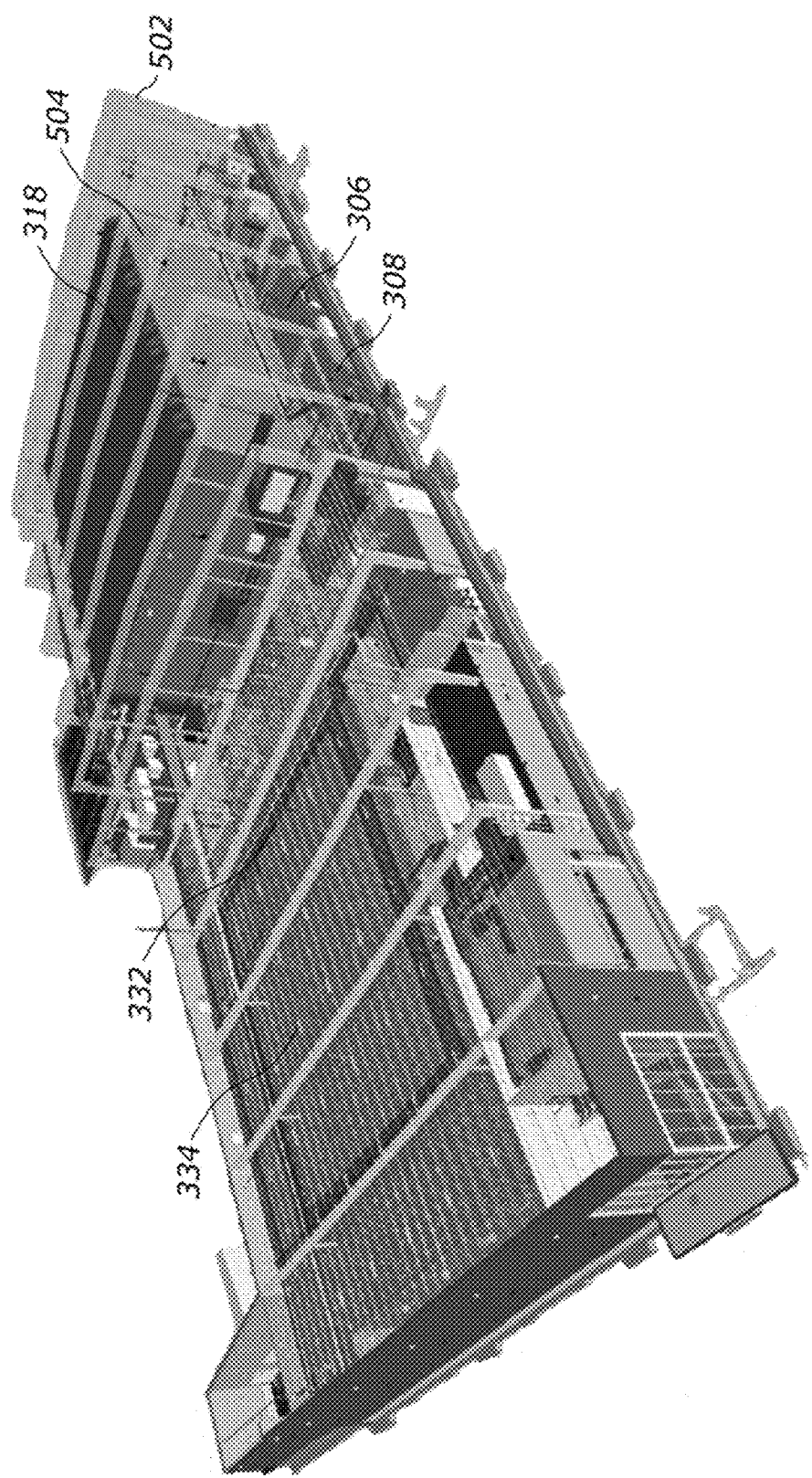
FIG. 6 is an isometric view of the example indoor growing facility of FIG. 5 shown with portions of the walls and roof as transparent to illustrate the interior components and layout of the facility.

Referring now to FIG. 6, an illustration of the growing facility 500 of FIG. 5 is shown with portions of the wall and roof as transparent to illustrate the interior components and layout of the farming facility. As can be seen, the grow zone 318 occupies the largest portion of the facility 500 and is located within a larger enclosed structure 502. It is understood however, that the facility could have multiple grow zone modules within the enclosed structure 502 and that the grow zone 318 does not need to occupy the largest footprint in the facility. The climate control equipment, and other systems that communicate with the grow zone 318 are located within the enclosed structure 502.

Turning now to FIG. 7, an example propagation tray 700 is shown. The tray 700 can include multiple openings 702 arranged with a predetermined spacing d1 in a longitudinal direction along the tray 700. The openings 702 can also be spaced apart at a distance d2 in a transverse direction across the tray 700. The openings 702 are used to retain the growing medium for the plant. Any suitable distances d1 and d2 can be used. Since the tray 700 is used during seeding, germination, and propagation, the distances d1 and d2 can be relatively small since the plants 704 that are growing during these stages of development are small. In some examples, the openings 702 can be spaced apart such that distances d1 and d2 are only a few millimeters. In other examples, the opening are spaced having distances d1 and d2 in a range of about 1 to 2 inches. In other examples, other spacing can be used. The tray 700 can be formed of any suitable material such as a suitable polymer, composite or other plastic. In other examples, other materials can be used.

FIG. 8 shows an example float 800 that can be used to retain the plants 704 during the growing stage of development after propagation. The plants 704 can be retained in the floats 800 until the plants 704 reach maturity and are harvested. As can be seen, the plants 704 are arranged in openings 802 in the floats 800 in less dense arrangement than that in the trays 700. Plants, including the growing media and root system, can be transplanted from tray 700 into the openings 802 of floats 800. Accordingly, openings 802 should be sized to receive the plants, including the growing media and root system removed from tray 700 after the propagation stage.

The plants 704 become much larger during the growing stage of development and thus must be positioned further apart from each to allow each plant 704 to grow to a mature size. The openings 802 can be arranged on the float 800 having a distance d3 from each other along the longitudinal direction and having a distance d4 from each along the transverse direction across the float 800. The distances d3 and d4 can be any suitable distance. In some examples the distances d3 and d4 are in a range of about 1 inch to 3 inches. In some examples, the distances d3 and d4 are in a range of about 8 inches to 16 inches. In other examples, other spacing or distances can be used.

FIGS. 7 and 8 illustrate one example of a tray and float system that includes a transplantation process, but other arrangement of trays and floats can be used in the facility. For example, the shape of the openings can be varied to accommodate different growing media or root systems. The location and arrangement of the openings can be varied. The thickness or height of the float can be varied to a desired specification in relation to the growth characteristics of the plant and its root system. The number of openings can be varied. Also, the float can be designed with features such as spacers that are used to position the float in a desired position above the base of the bench.

In other examples, a single tray or float can be used for the entire growth cycle of the plant from seeding to harvest. Such a float design would not require transplanting after propagation. Such a float should have a design to receive the growing media in a manner that accommodates the plant growth throughout its growth cycle until harvest.

Figure 9:
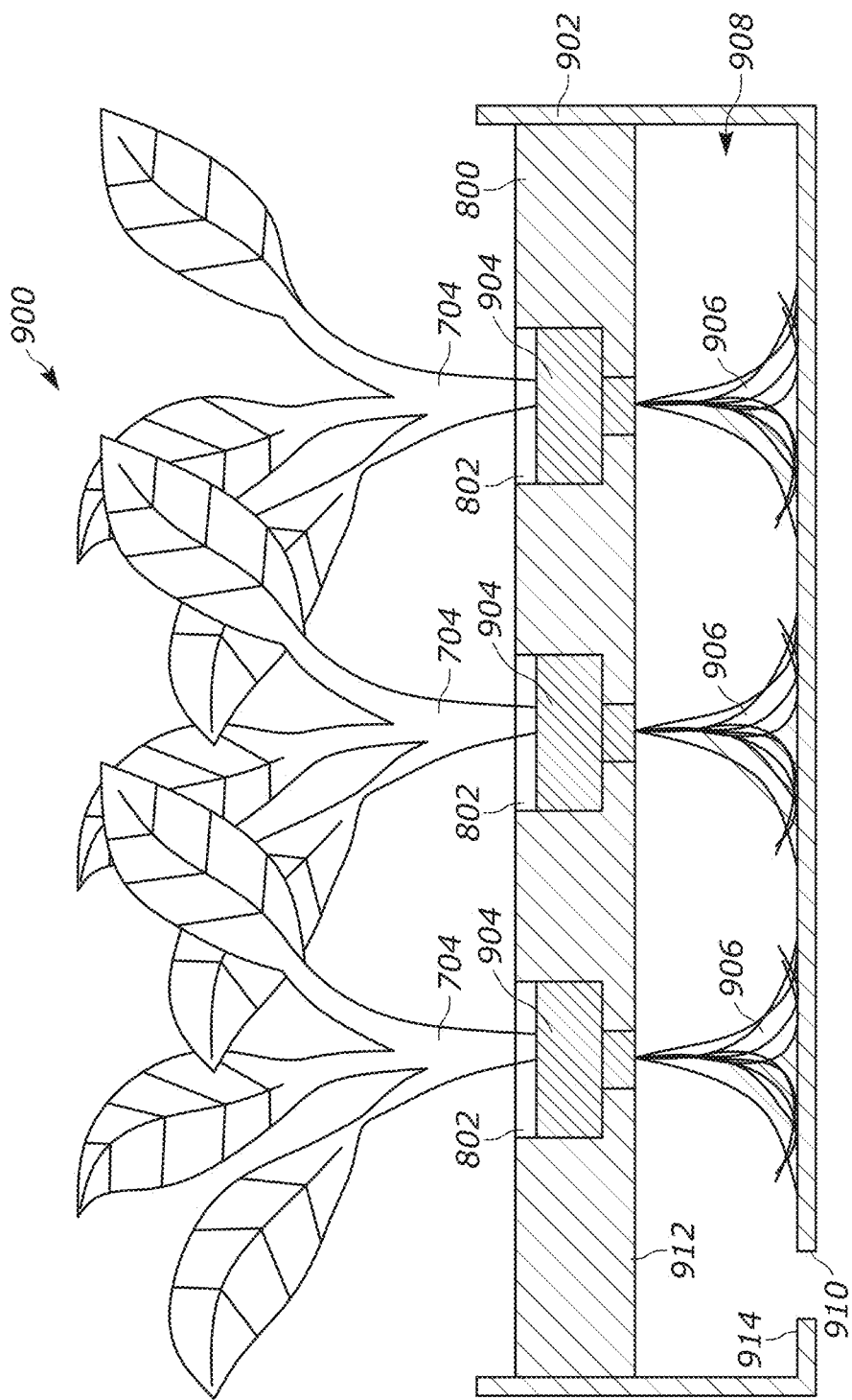
FIG. 9 is a cross-sectional illustration of a float and bench assembly used during the growing stage of the growing processes of the present disclosure.

FIG. 9 shows an example bench assembly 900 that includes a float 800 retained in a bench 902. After the plants 704 exit propagation, the plants 704 are transplanted from the tray 700 into the floats 800. During such transplanting, the plants 704 and the growing medium 904 are removed from the trays 700 and are re-inserted into the openings 802 of the float 800. The openings 702 of the trays 700 and the opening 802 of the floats 800 can have the same outer size or outer diameter. In this manner, the plants 704 and the growing medium 904 can be re-inserted into the floats 800 in the less dense arrangement as previously described.

As further shown, the float 800 can be inserted into a bench 902. The bench may be a rectangular box that can be sized so that one or more floats 800 fit inside the internal volume defined by the walls of the bench 902. The float 800 may be positioned so that a lower surface 912 of the float 800 is positioned above a base 914 of the bench 902. This arrangement defines a cavity 908 between the lower surface 912 and the base 914. To create cavity 908, the float 800 can be designed to include legs, spacers, or other features to position the lower surface 912 of the float 800 above the base 914 of the bench. In other examples, one or more protrusions, supports, ledges, or other surface can be added to the walls of the bench 902 to position the lower surface 912 of the float 800 spaced apart from the base 914 of the bench 902. The roots 906 of the plants 704 can extend from the float 800 into the cavity 908. In this arrangement, the roots 906 can grow to a suitable size to support a mature plant despite the growing medium 904 being relatively small for a mature plant. This arrangement can further support an ebb and flood method of irrigating the plants 704.

In such an ebb and flood method of irrigation, water is deposited into the bench 902. The water fills the bench 902 including the cavity 908. The bench 902 also includes a drain 910 positioned in the base 914. The water drains from the cavity 908 through the drain 910. The drain 910 can be suitably sized so that the water drains from the cavity 908 in a predetermined amount of time. The amount of time can be in a range of about 3 minutes to about 10 minutes. In another example, the predetermined amount of time to drain is about 5 minutes. The water that is deposited into the bench 902 to fill the cavity 908 can contain desirable nutrients and other additives that provide the necessary nutrition to the plants 704 for proper development and growth. The roots 906 can absorb or otherwise retain moisture and nutrients from the water to support growth and development of the plants 704.

Figure 10:
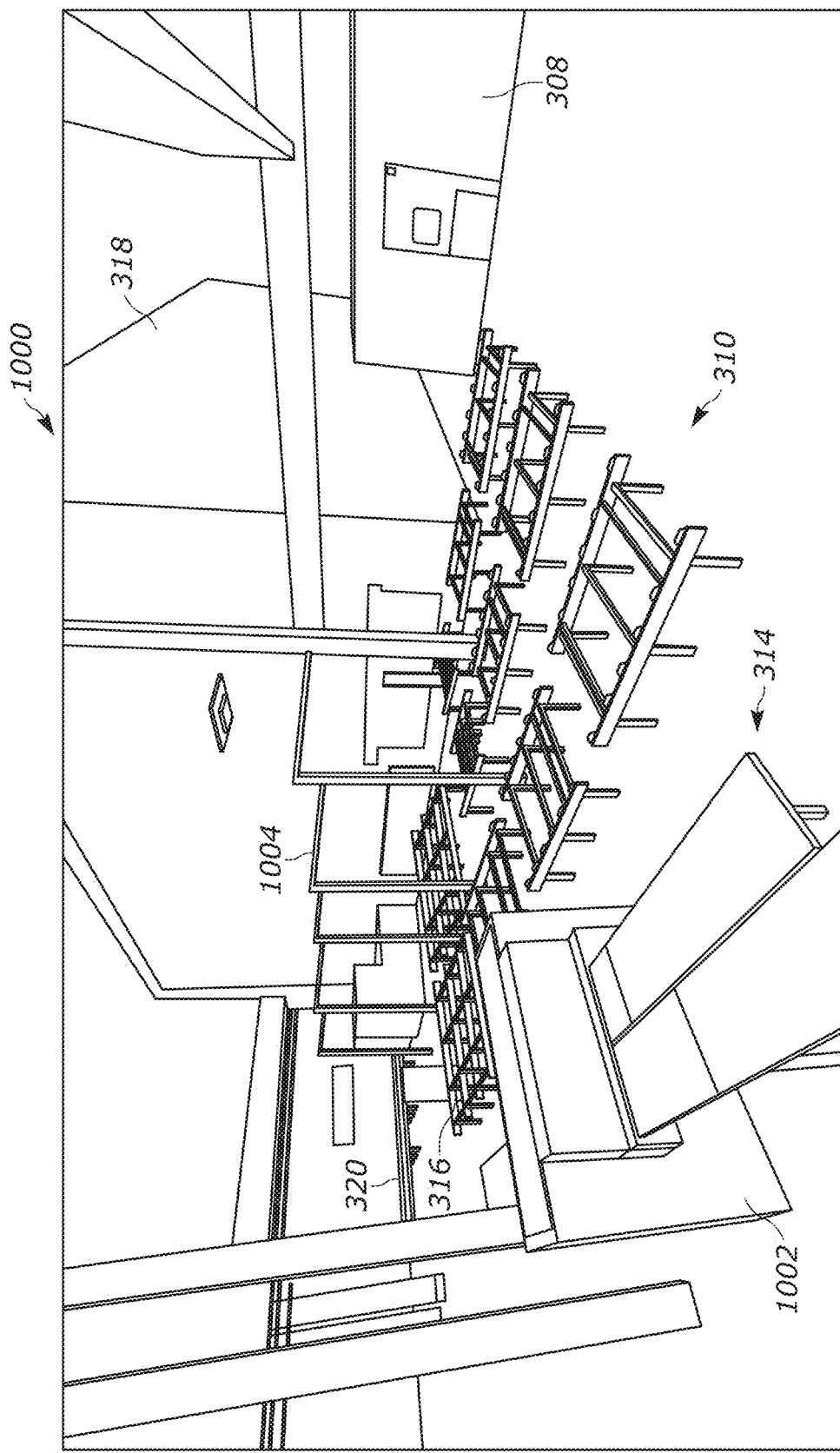
FIG. 10 is an illustration of portions of an example indoor growing facility of the present disclosure.

Referring now to FIG. 10, an illustration of portions of a growing facility 1000 are shown. In this example, a germination zone 308 such as a germination room is positioned adjacent to the propagation loading zone 310. The propagation loading zone 310 can include one or more racks (not shown) that include wheels or rollers to allow the trays 700 to easily moved from the germination room and inserted into the propagation zone 312. As further shown, the transplanting zone 314 can include a transplanting apparatus 1002 that can automatically transfer the plants 704 from the trays 700 to the floats 800. The floats can then be positioned inside the benches 902 and moved into the grow zone 318 in the growing loading zone 316. The benches can be placed near the growing loading zone 316 by an automated overhead crane 1004 after washing and then loaded with floats 800. The floats and benches can be moved, for example, along the rail system into the growing loading zone 316. In other examples, the crane 1004 can also be used in the growing unloading zone 320 to move the floats 800 and/or benches 902 in the growing unloading zone 320.

Figure 30:
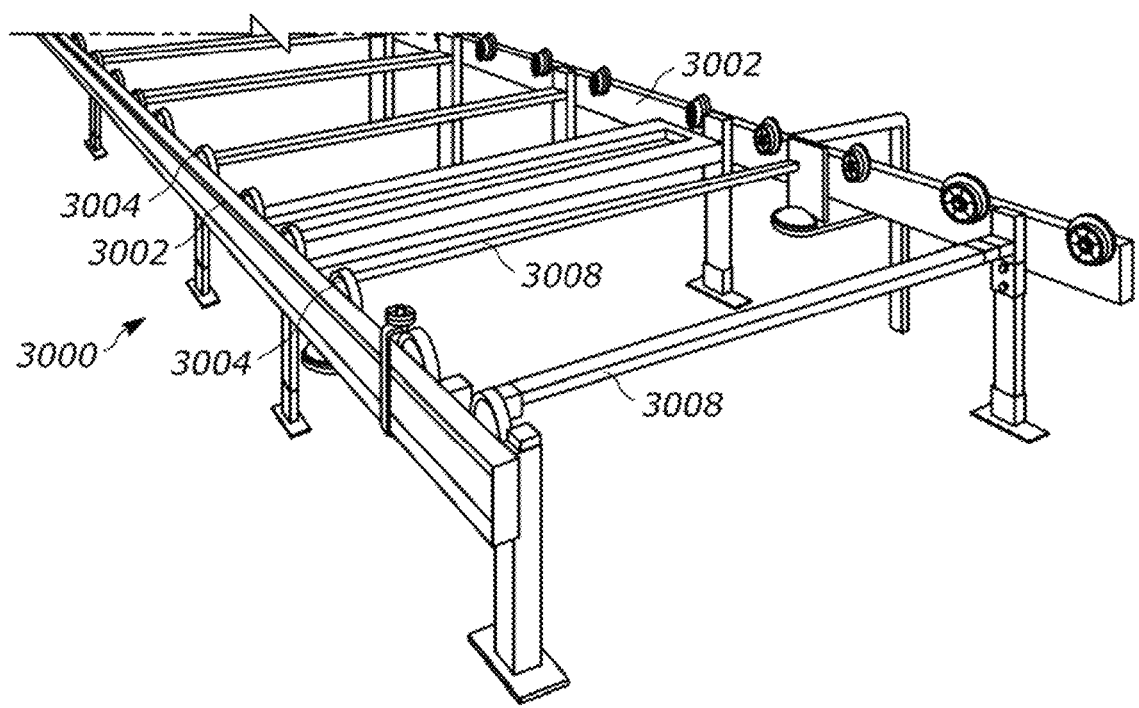
FIG. 30 is a perspective illustration of an example rail system in accordance with some embodiments of the present disclosure.

As shown in FIG. 30, the growing facility can include rail system 3000 that is used to transport, convey or otherwise move the plants in the indoor growing facility 1100. The rail system 3000 can be used in the various zones previously described. The rail system 3000 can be used, for example, in the propagation loading zone 310, the propagation zone 312, the transplanting zone 314, the growing loading zone 316, the grow zone 318, the growing unloading zone 320 and the harvesting zone 322. The rail system 3000 can include two elongated rail members 3002 that can extend along a longitudinal direction of the rail system 3000. The rail members 3002 are spaced apart at a suitable lateral width so that a tray, float, or bench can be supported between or on the rail members 3002. The rail members 3002 can be secured at the desired lateral width by one or more lateral members 3008. The rail members 3002 and the lateral members can be made of a suitable aluminum, steel or other alloy and can have a square, rectangular, round or other cross-sectional shape to provide suitable rigidity and strength to support the trays, float and/or benches that contain the plants at various stages of development.

The rail system 3000 may also include one or more wheels 3004 that can be periodically positioned on the rail members 3002. The wheels 3004 can allow the trays, floats and/or benches to be easily moved along the length of the rail system 3000. In other examples, the rail system 3000 can include rollers that are positioned between the rail members 3002 to provide similar functionality. In still other examples, the trays, floats and/or benches can include wheels or rollers that are configured to roll on the rail members 3002. In still other examples, both the rail members 3002 and the trays, floats, and/or benches include wheels or rollers.

Figure 31:
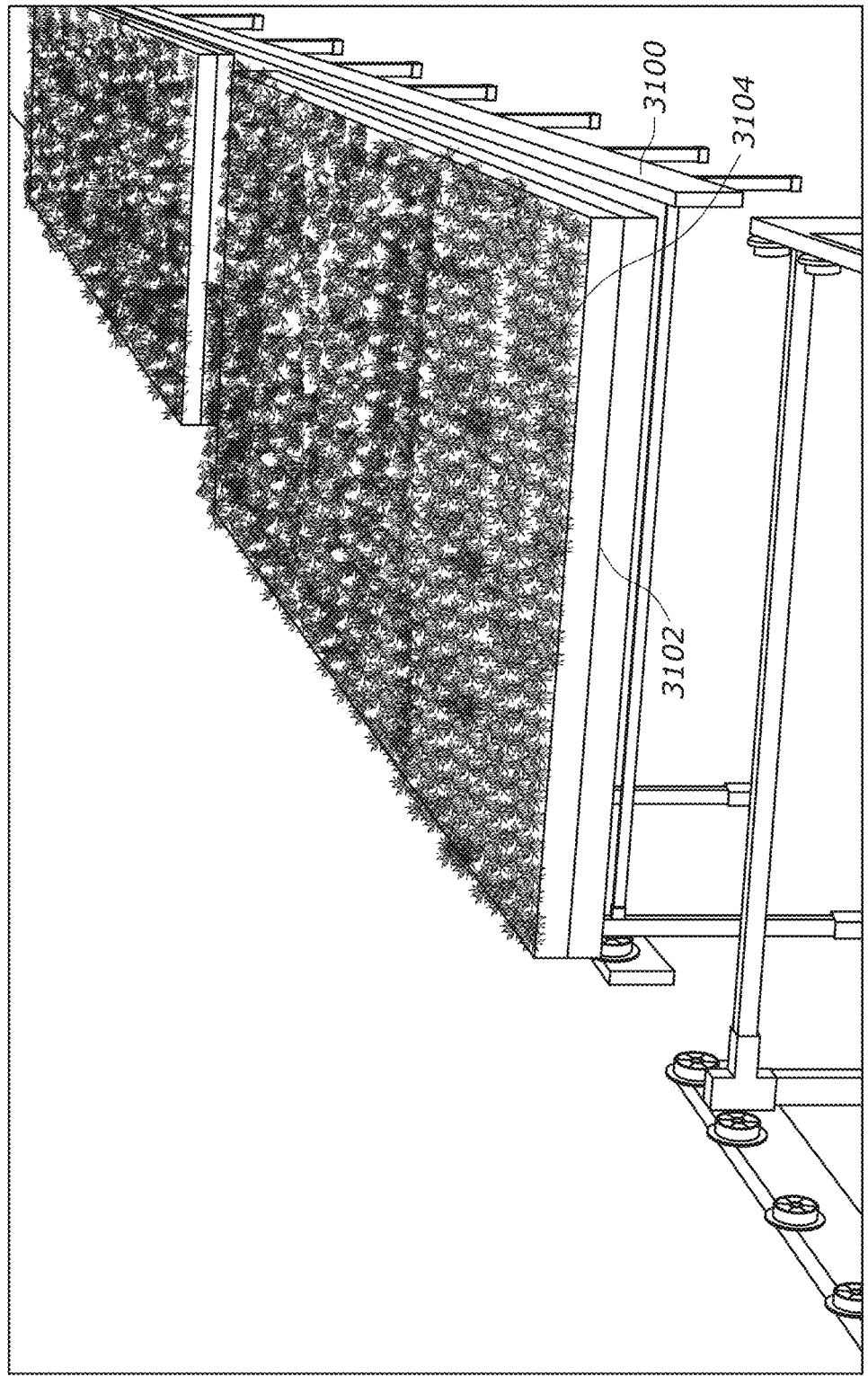
FIG. 31 is a perspective illustration of an example rail system supporting benches containing plants in accordance with some embodiments of the present disclosure.

As shown in FIG. 31, a rail system 3100 may be similarly configured to the rail system 3000 previously described. The rail system 3100 is configured to support a bench 3102 that includes plants 3104. As can be appreciated, a width of the bench 3102 can be configured to be similar in size to the lateral width of the rail system 3100.

Figure 32:
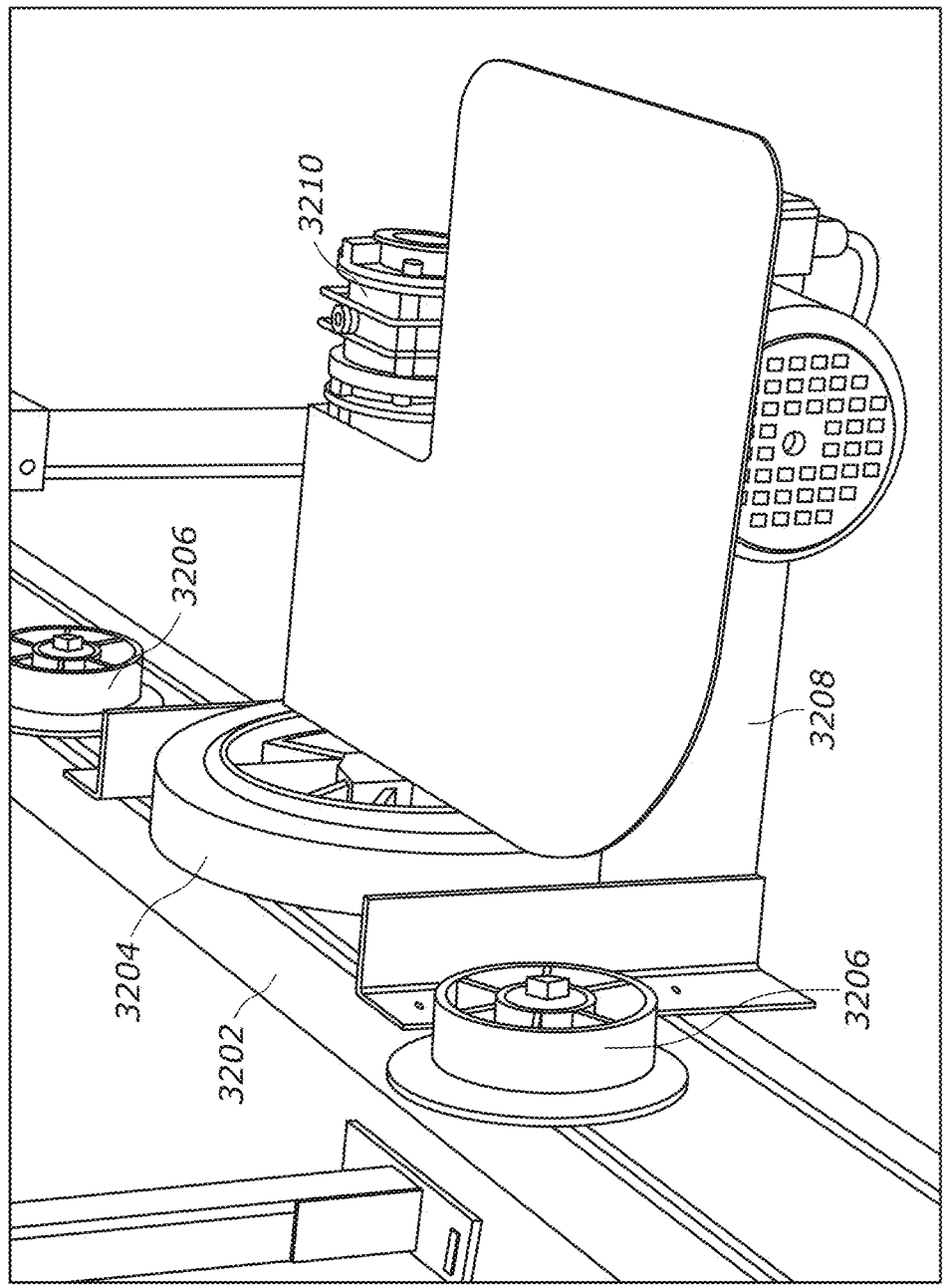
FIG. 32 is an illustration of an example powered roller in accordance with some embodiments of the present disclosure.

An example of an automated conveyance system is shown in FIG. 32, where a powered roller 3204 and motor assembly 3208 is illustrated. The powered roller 3204 can be positioned on one or both of the rail members 3002. In the example shown, the powered roller 3204 is connected to rail member 3202. The powered roller 3204 is coupled to a motor 3210 that can be a suitable servo-motor, stepper motor, electric motor or the like. The motor 3210 can turn the powered roller 3204. When a tray, float, and/or bench is positioned on the rail system, it rests on or contacts the powered roller 3204. Thus, when the motor 3210 rotates the powered roller 3204, the tray, float and/or bench is moved along the rail system in a direction of the rail member 3202. The rail system may also include one or more wheels 3206. The wheels 3206 can be free-spinning and provided to support the tray, float, and/or bench. With this configuration, a powered roller 3204 is only need at predetermined positions along the rail member 3202. In one example, a powered roller 3204 can be provided so that only one powered roller 3204 contacts a particular tray, float or bench at one time.

The motor 3210 can be coupled to controller or other computing device that can control the powered roller 3204 and cause movement of the trays, floats, and/or benches at desired times and/or at predetermined schedules or events. Accordingly, the movement of the benches can be automated and controlled remotely.

Figure 11:
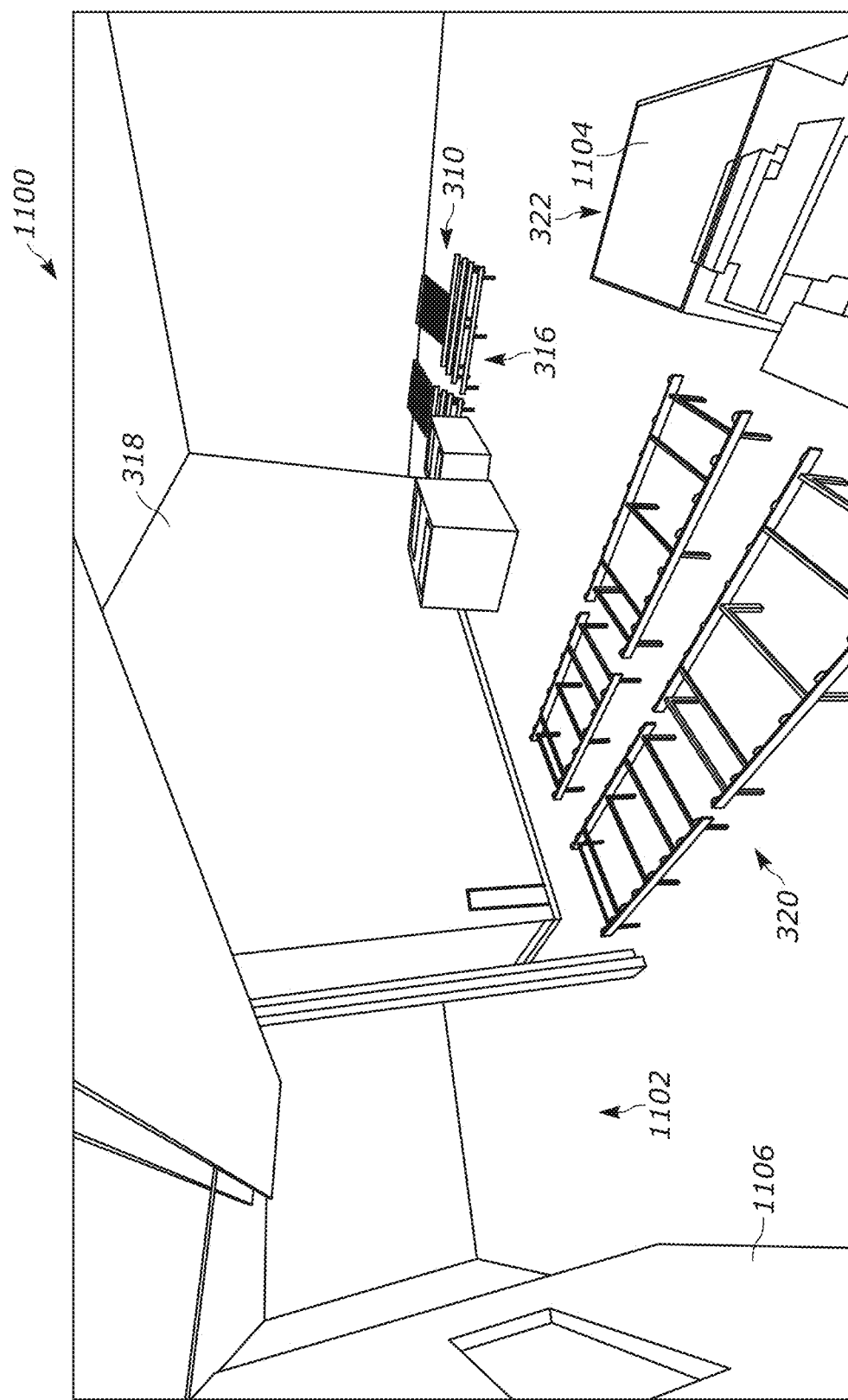
FIG. 11 is an illustration of further portions of an example indoor growing facility of the present disclosure.

FIG. 11 illustrates another view of the indoor growing facility 1100 from a different angle from that shown in FIG.

10. In this view, the growing unloading zone 320 is shown to include one or more rails systems with rollers that can be used to move the floats 800 and/or the benches 902. In the background, the growing loading zone 316 and the propagation loading zone 310 can be seen. As further shown, a harvesting apparatus 1104 can be positioned in the harvesting zone 322. The grow zone module or structure 318 can be enclosed in the building 1106. The grow zone 318, which can be a modularized structure can be separated from the exterior walls of the building 1106. As will be further described, the space 1102 shown can include the air handling equipment and other climate control elements that can provide air flow to the grow zone 318 with predetermined characteristics to achieve a desired climate within the grow zone.

Figure 12:
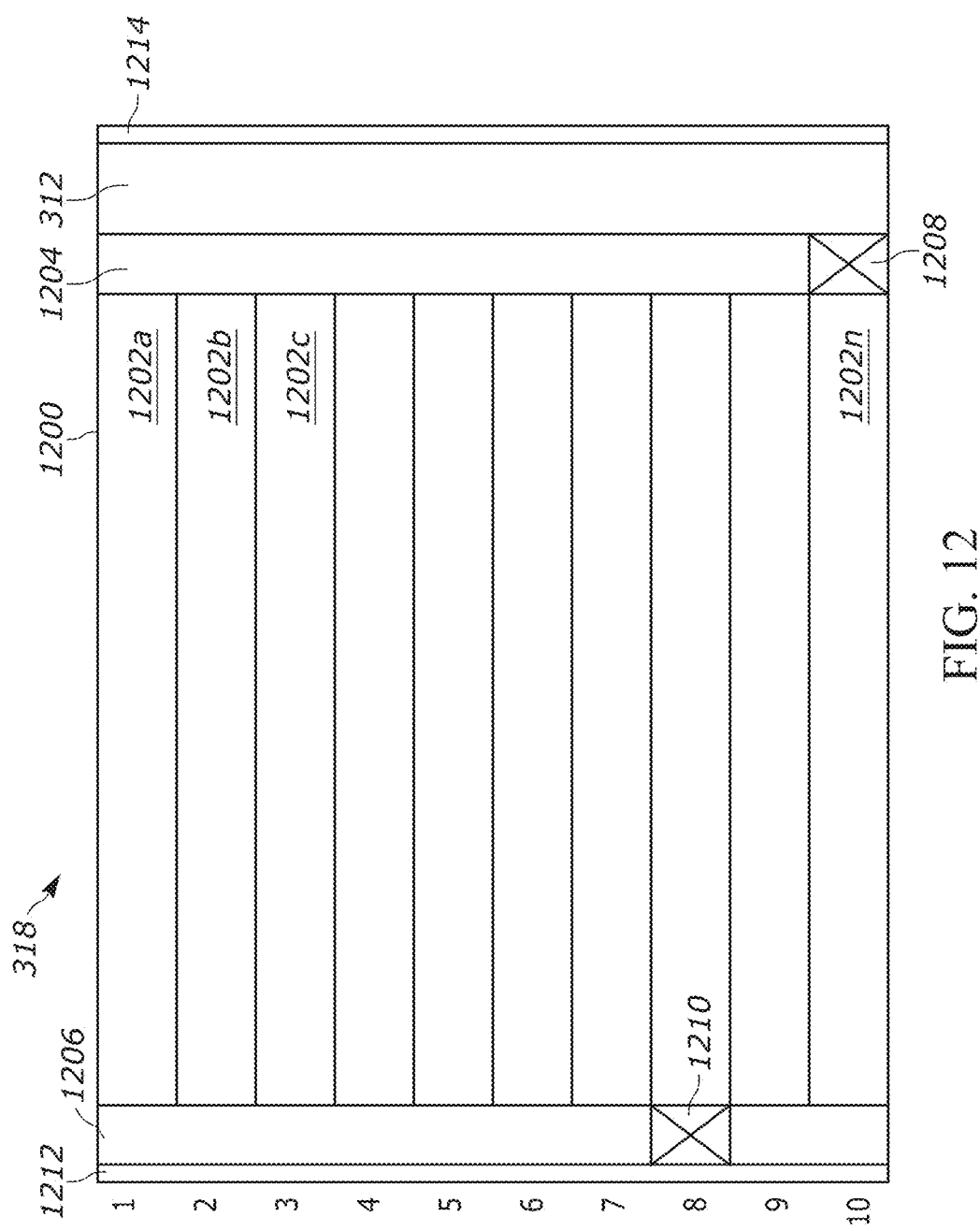
FIG. 12 is a side view illustration of an example structure of a grow zone of an indoor growing facility of the present disclosure.

As previously described, each grow zone module 318 can include an internal design that separates the grow zone module 318 into one or more growing pathways. FIG. 12 illustrates an example arrangement of the growing structure inside a grow zone module 318. While the exact arrangement such as the number of rows or pathways may vary, the relative arrangement of the grow zone module, the propagation zone and other aspects as hereinafter described provide improved performance and growing conditions over that of other growing structures. The grow zone module 318 can be a modularized structure that can be sized to the specific needs of the indoor growing facility. Moreover, in some examples, it is preferred to have multiple grow zone modules 318 in a single indoor growing facility. Grow zone modules 318 can vary in size, footprint, number of layers and number of rows within each layer.

FIG. 12 illustrates a plan view of an example growing structure 1200 of a grow zone module 318. In the example shown, the growing structure 1200 may include one or more growing rows 1202. Any number of rows 1202a, 1202b, to 1202n may be used. In this example, the growing structure 1200 includes ten growing rows 1202. The rows 1202 can be similarly sized and can be sized so that the width of the row (i.e., measured up and down as shown in FIG. 12) allows one float 800 or one bench assembly 900 to be positioned in a row. Multiple bench assemblies 902 can then be inserted into each row and abut one another along the longitudinal direction of the row 1202.

Figure 13:
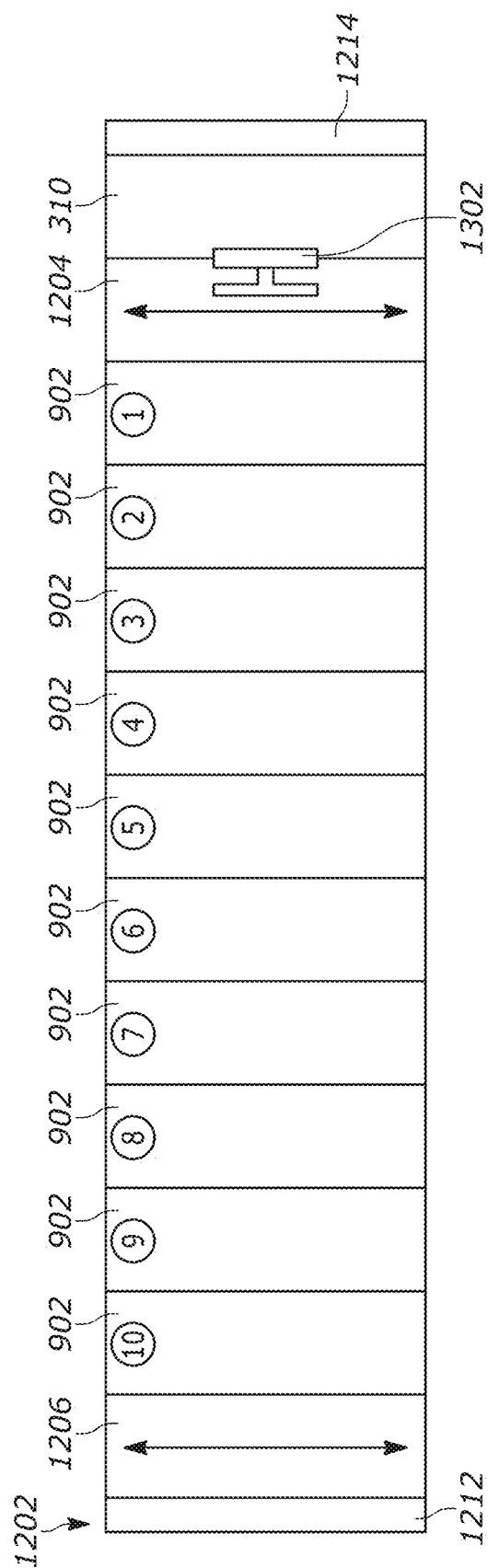
FIG. 13 is a top view illustration of one row in a grow zone structure of an indoor growing facility of the present disclosure.

Such an arrangement is shown in FIG. 13. As shown, a single row 1202 includes ten bench assemblies 902 positioned side by side in the row. In other examples, the row 1202 can be sized to allow for more than ten bench assemblies or to support less than ten assemblies.

Referring back to FIG. 12, the growing structure 1200 also includes a loading transportation lane 1204 and an unloading transportation lane 1206. The loading transportation lane is an area of the growing structure 1200 that allows bench assemblies 902 that are loaded into the grow zone 318 to be positioned in a row as may be desired according to a predetermined growing schedule. For example, each row 1202 may include a different plant variety or may be on a different growing schedule than an adjacent row or pathway. As such, a newly propagated and transplanted bench assembly 902 of plants 704 may need to be inserted into the growing structure 1200 in a desired row. The loading transportation lane 1204 allows the bench assembly to be moved to the desired row using a loading elevator 1208 and other conveyance equipment such as rollers, conveyors, robots or the like. In one example, the bench assembly 902 can be pushed into a desired row 1202 by a pusher 1302 (FIG. 13). The pusher 1302 can be a pneumatic, electrical, hydraulic or mechanically operated bar or other bumper than extend toward the first position in the row 1202 to move the bench assembly 902 from the loading transportation lane 1204 and into the first position. As the bench assembly 902 is pushed or otherwise moved into the first position, the bench assemblies 902 push against one another to advance the bench assemblies along the row 1202 toward the unloading transportation lane 1206. Thus, as one bench assembly is moved into the first position, the bench assembly 902 previously in the tenth position is pushed into the unloading transportation lane 1206.

The unloading transportation lane 1206 operates similarly to the loading transportation lane 1204 and allows bench assemblies 902 that include matured plants ready for harvesting to be unloaded from the grow zone. When the bench assembly 902 is pushed out of the row 1202 from the tenth position, the bench assembly 902 can be moved using conveyance equipment, such as that previously described, that may include unloading elevator 1210 to move the bench assembly out of the grow zone 318 using the unloading transportation lane 1206.

As further shown in FIGS. 12 and 13, the growing structure 1200 may also include a plenum wall 1212 and a return wall 1214. The plenum wall 1212 can be positioned at a first side of the growing structure 1200 at a first end of the rows 1202. The return wall 1214 can be positioned at an opposite end of the growing structure 1202 than the plenum wall 1212. The plenum wall 1212 can operate to supply an air flow having predetermined characteristics to the grow zone 318. As will be further described, the plenum wall 1212 can be fluidly connected to one or more air handling units that supply a volume of air that is separated and supplied to each pathway in the growing structure. The return wall 1214 is positioned and configured to collect air flowing in the growing structure 1200 can return the air to the air handling units where it is re-conditioned and then re-supplied to the grow zone.

As further shown in this example, the propagation zone 312 can be positioned in the growing structure 1200 and can be combined within the grow zone module. The propagation zone 312 can be positioned at an outer side of the growing structure and can be positioned between the loading transportation lane 1204 and the return wall 1214. In this position, the plants in the propagation zone are subjected to desirable environmental conditions that are supplied by the environmental controls of the grow zone 318. Thus, separate environmental controls or a separate propagation chamber are not required.

The propagation zone 312 can operate, in one example, as a push system. In such an example, the trays 700 of plants 704 are pushed into the propagation zone 312 at the propagation loading zone 310. When one tray or bench is pushed into the propagation zone 312, one tray or bench is pushed out of the propagation zone 312. In such a manner, the propagated plants are pushed through the propagation zone 312. In other examples, other methods of automated or manual loading and unloading can be used.

Turning now to FIGS. 14A-C, another example growing structure 1400 is shown. In this example, the growing structure 1400 is configured to have ten rows 1402 (see FIG. 14B) and two columns 1404 (see FIG. 14C). The configuration of the growing structure 1400 can define twenty growing pathways 1406. The growing structure 1400 can be used as a grow zone 318 or multiple such growing structures 1400 can be positioned next to each other to define a larger grow zone module 318. In another example, five of the structures 1400 shown can be positioned side-by-side to define a grow zone 318 that includes one hundred grow pathways 1406. In other examples, other size grow zones 318 can be used. In other examples, the grow zone 318 can be one large zone partitioned into ten columns 1404 and ten rows 1402 to create one hundred grow pathways 1406. It is understood that the grow zone module can vary in size and can include more than one hundred grow pathways 1406 or can include less than one hundred grow pathways 1406.

As further shown, the grow structure can include a loading transportation lane 1408 and an unloading transportation lane 1410. The loading transportation lane 1408 and the unloading transportation lane 1410 can be configured as previously described and can be used to load and unload the float and/or benches into or from the growing structure 1400, respectively.

As further shown, the propagation zone 312 may be positioned in the growing structure 1400. The propagation zone 312 can be positioned at an end of the growing structure 1400 and can be positioned adjacent the loading transportation lane 1408.

The growing structure 1400 can be made of any suitable support structure that can support the weight of the floats and/or benches that will be suspended and positioned in the pathways 1406. In one example, the support structure of the growing structure 1400 is made of steel racking that include support columns and beams arranged perpendicularly to each other to form the rows 1402 and the columns 1404 that, in turn, define the pathways 1406. In other examples, the growing structure 1400 can be constructed of other suitable materials.

Figure 33:
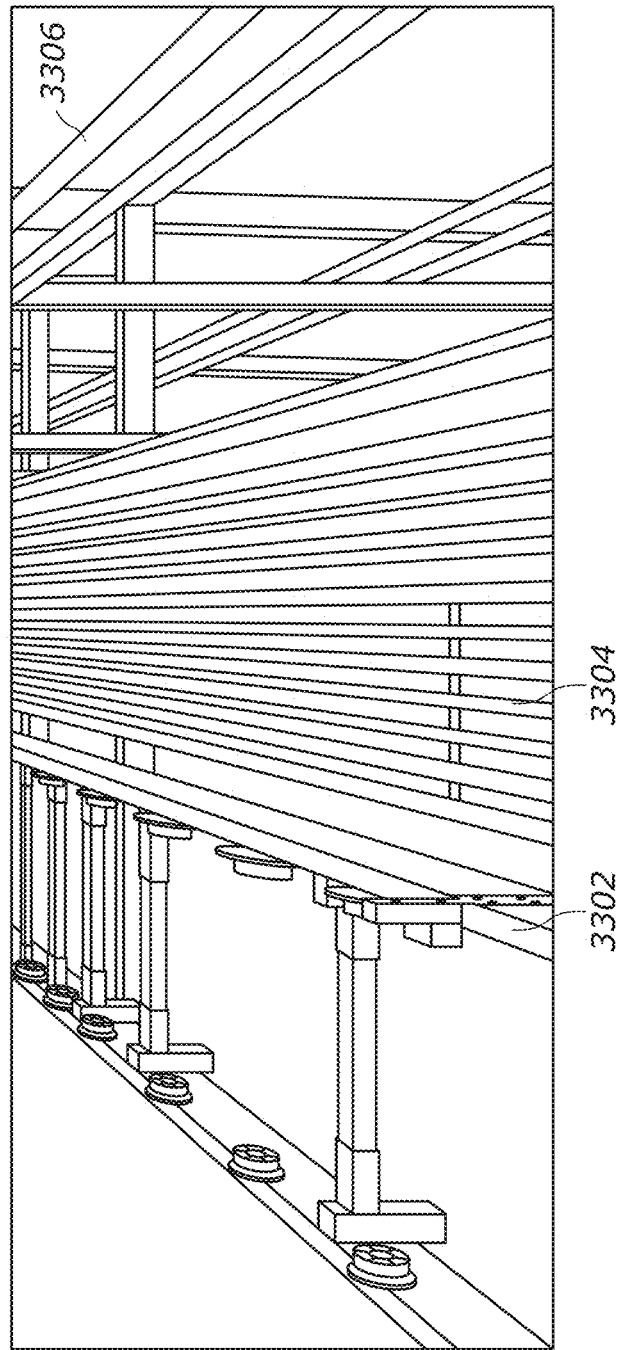
FIG. 33 is an illustration of an example walkway positioned adjacent an example rail system in accordance with some embodiments of the present disclosure.

As shown in FIG. 33, the growing structure 1400 may include one or more walkways 3304 that can be positioned periodically in the growing structure 1400. The walkways 3304 can provide access to various areas in the growing structure for observation, repair, maintenance and the like. In the example shown, one row of the growing structure 1400 is shown and the row may include a rail system 3302 (such as the rail systems previously described) that can support multiple trays, floats, and/or benches of plants. Adjacent to the rail system 3302, a walkway 3304 can be provided with suitable size to allow an operator to walk on the walkway 3304 to access the rail system 3302 and other rail systems (not shown) that may be positioned adjacent to the rail system 3302. A safety rail 3306 can be provided proximate to the walkway 3304 to allow the operator to grasp and to provide safety. The walkways 3304 can be positioned at any suitable interval in the growing structure 1400 to provide access to the plants growing in the grow zone. In one example, a walkway 3304 is provided at every other row around a perimeter of the growing structure. Walkways 3304 can also be provided between columns to provide access to interior rows of plants in the grow zone.

It has been observed that the plants growing in the growing structure 1400 demonstrate improved development when the climate conditions are maintained at predetermined levels or within certain ranges in each growing pathway 1406. The predetermined levels of climate conditions may vary between plant varieties. It has also been observed that it can be difficult to maintain the predetermined climate conditions in the growing pathways unless the space of the growing pathways is sufficiently isolated. In some examples, barriers can be located between the growing pathways 1406 to improve the control of the climate conditions therein. For example, when vertical barriers are not positioned between the columns 1404 and when horizontal barriers are not positioned between the rows 1402, the environmental conditions can fluctuate undesirably. Without barriers, the air flow between the pathways 1406 can mix and convection effects can cause hotter air to rise and cooler air to fall within the growing structure 1400.

To reduce the undesirable effects previously described, vertical barriers and horizontal barriers can be positioned in between the rows 1402 and the columns 1404 to define the individual, separated pathways 1406. In one example, vertical wall barriers can be constructed between the columns 1406. In another example, vertical sheets of material such as tarps of a suitable plastic, vinyl, canvas or the like can be hung between the columns 1406 and secured to the rail systems that form the growing structure 1400. Horizontal sheeting (or other barriers) can be positioned on the rail systems to form barriers between the vertically stacked rows 1402. In other examples, insulated panels can be used. In other examples, the floats or benches that hold the plants in the growing structure 1400 form suitable horizontal barriers to restrict the intermixing of air flow between the rows 1402. In such examples, trays or other horizontal barrier members can be positioned in the loading transportation lane 1408 and/or in the unloading transportation lane 1410 to separate the rows 1402 in the transportation lanes that would otherwise not include the floats or benches of plants.

To further improve the stability of the climate conditions within the grow zone and in each pathway 1406, a method of delivering laminar flow of air throughout the grow zone is needed. An improved method of delivering a laminar airflow is described herein. In one example, the growing structure 1400 can include a plenum wall. The plenum wall 1420 can include a structure of ducts that can separate and guide air flow to each of the pathways 1406. As shown, the plenum wall 1420 can be fluidly connected to one or more air handling units 1424. The air handling units 1424 can supply a volume of conditioned air to the plenum wall 1420. The plenum wall 1420 can separate and guide a supply of air to each of the pathways 1406 to produce a laminar air flow in each of the pathways 1406. The laminar air flow may also have other predetermined climate parameters such as humidity, temperature and/or air flow rate.

The air flow can exit the air plenum wall 1420 and travel through each of the pathways 1406 in the growing structure. The return wall 1422 is positioned at an opposite end of the growing structure 1400 and serves to collect and return the air from the growing structure 1400 to the air handling units. The return wall 1422 can be fluidly connected to one or more air return ducts 1426. The return ducts 1426 are also fluidly connected to the air handling units 1424. The air flow can be re-conditioned and then re-supplied to the growing structure 1400 via the plenum wall 1420. In the example shown, the growing structure 1400 includes two return ducts 1426 positioned on or above a top surface of the growing structure 1400. In other examples, other quantities of return ducts 1426 can be used and the return ducts 1426 can be routed in other manners to the air handling units 1424.

As can be seen, the air flow in the growing chamber moves in the direction of the arrows from the air plenum wall 1420 to the return wall 1422. The plants that are positioned in the floats are loaded into the growing structure at the loading transportation lane 1408 and move through the growing structure 1400 in a direction opposite to the air flow direction. In this manner, the most mature plants are subjected to conditioned air that is closest to the plenum wall 1420. The most mature plants can be subjected to air flow that has the predetermined characteristics or climate parameters. As can be appreciated, the air flow may change as the air moves over the plants as it travels from the air plenum wall 1420 to the return wall 1422. The air may be heated and/or increase in humidity as it travels past the plants in the growing structure 1400. This is an advantageous arrangement because the more mature plants transpire more than the younger plants and prefer cooler more conditioned air. Younger plants transpire less and thus do not require air that is as conditioned as that flowing over mature plants. Accordingly, as shown, dehumidified, cooled air is delivered into the grow zone adjacent the mature plants and as it passes over the mature plants, the air flow increases in humidity and warms as it moves toward the younger plants located closer to the loading transportation lane 1408. Thus, the laminar airflow within each pathway improves the climate within the pathway.

Figure 15:
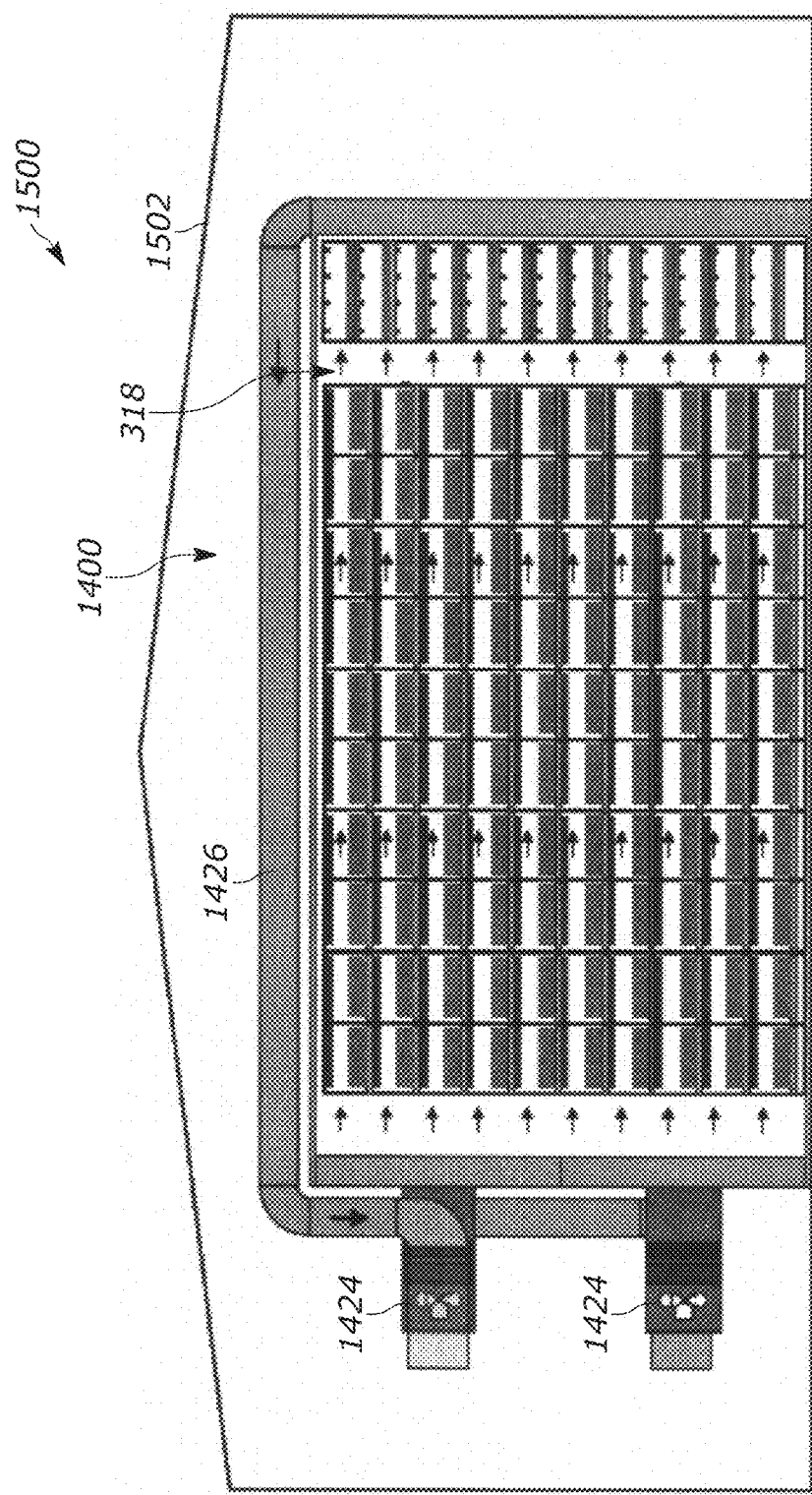
FIG. 15 is a side view of an example indoor growing facility of the present disclosure showing aspects of the grow zone structure, propagation zone structure and air handling paths.

As shown in FIG. 15, the growing structure 1400 may be positioned inside a structure 1502. Thus, the growing facility 1500 includes a fully enclosed growing structure 1400 that is enclosed in an outer structure 1502. Such a configuration allows the climate control systems or environmental control elements, such as air handling units 1424 and return ducts 1426 to be positioned inside an environmentally controlled chamber while also being positioned outside the grow zone 318. Thus, the operation of the air handling units 1424, the return ducts 1426 and other environmental control elements do not negatively affect the ability to maintain stable conditions in the grow zone 318 while also preserving the stable operation of the climate control systems.

Figure 16:
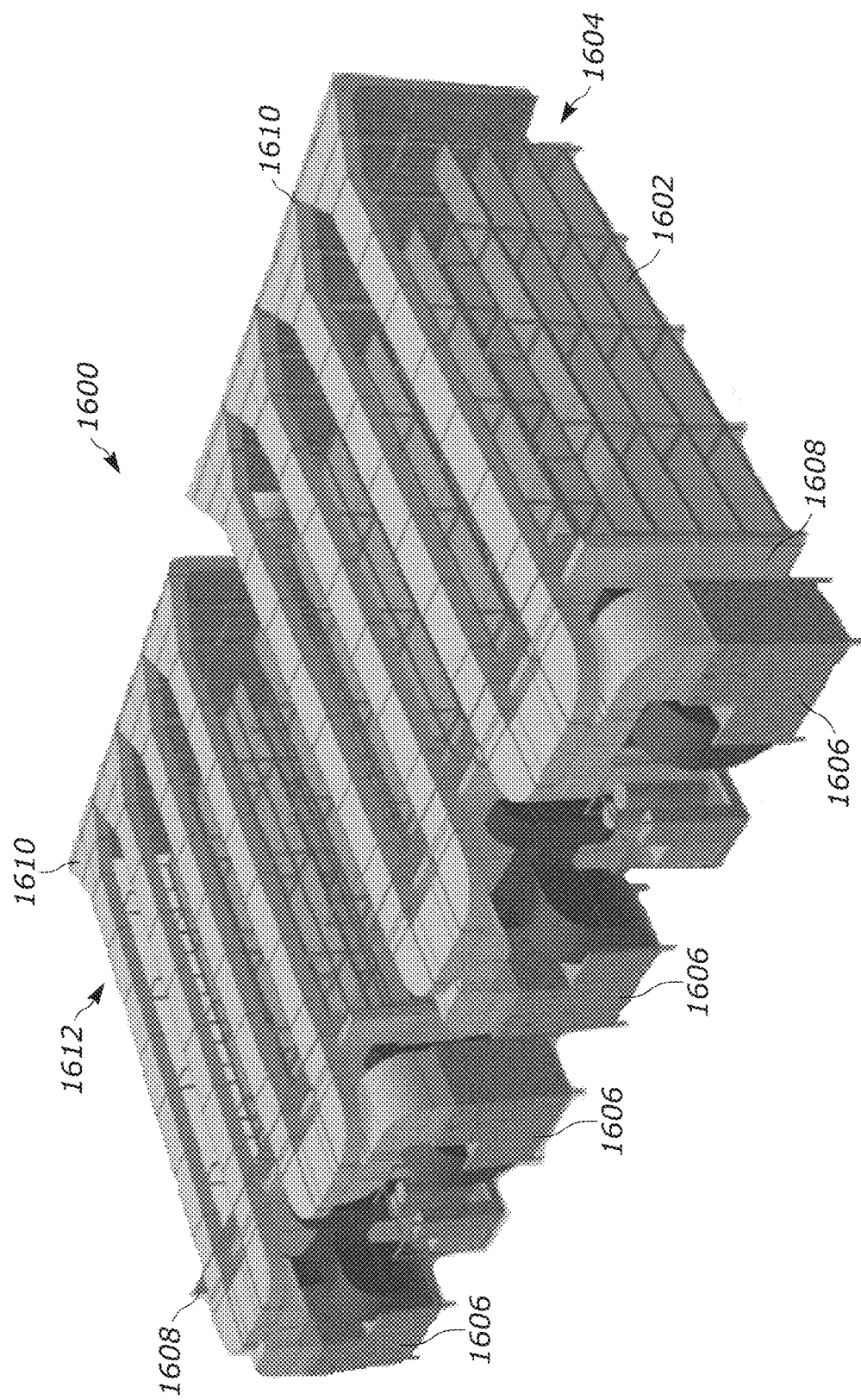
FIG. 16 is an isometric view of an example grow zone structure and air handling assembly.

As shown in FIG. 16, another example growing module 1600 is shown. While sized differently from the growing structure 1400 previously described, the growing module 1600 includes many similar elements and is configured in a similar arrangement. In this example, the growing module 1600 can be fully enclosed in an outer building structure 1502. The walls of the outer building structure 1502 are not shown for illustration purposes. The growing module 1600 can include a grow racking system 1602 that can define various rows and columns in the growing module 1600. The grow racking system 1602 can include horizontal barriers to separate the rows in the racking system 1602 and can also include vertical barriers (not shown) to define a multitude of climate isolated grow pathways.

The growing structure 1600, in this example, also includes four air handling units 1606 that are positioned at one end of the growing module 1600. The air handling units 1606 are fluidly connected to the plenum wall 1608 that operates to separate and deliver air flow to each of the pathways or rows of the growing module 1600. The return wall 1610 may be positioned at an opposite end of the growing module 1600 and can operate to return the air that has travelled within the growing module 1600 to the air handling units 1606 via the return ducts 1612. As also shown, the growing structure 1600 can include a transportation lane 1604 that is a space or structural system adjacent or coupled to the grow racking system 1602 that allows plants or trays carrying floats of plants to be moved within the grow module 1600.

FIGS. 17A and 17B illustrate growing facilities that can operate in different modes of operation in order to condition the air that enters the grow zone to have predetermined climate conditions or characteristics such as air temperature, dew point, humidity and the like. As shown, the growing facility 1700 can include a grow zone 318 as previously described. The grow zone 318 can be positioned inside a structure 1708. The air handling units 1702 and a heat pump system 1704 can also be positioned inside the structure 1708 but outside the grow zone 318. The air handling units 1702 can be coupled to the grow zone 318 to supply air flow to the grow zone 318.

As further shown, the air handling units 1702 can be coupled to the heat pump system 1704. The heat pump system can operate via suitable heat exchange devices and heat exchange fluids to move heat from inside the structure 1708 to outside the structure 1708 and vice versa. The heat pump system 1704 may include a dry cooler 1706 that is positioned outside the structure 1708 in an ambient external environment. The dry cooler 1706 can be coupled to the heat pump system 1704 with suitable conduits through which water or other suitable heat exchange fluid (e.g., refrigerant) can flow to transfer heat from inside the structure 1708 to the ambient environment outside the structure 1708.

As shown in FIG. 17A, a standard operating mode is shown. In the standard operating mode, the air that flows through the grow zone 318 accumulates moisture and raises the temperature and humidity of the air when it is returned to the air handling unit 1702. The air must be dehumidified and then cooled so that it can absorb moisture when it is re-supplied to the grow zone 318. To achieve this result, the heat pump system 1704 can use water (or other heat exchange fluid) that is cooled by the dry coolers to remove heat and moisture from the returned air flow via a suitable heat exchanger in the heat pump system 1704. The heat that is removed from the air and exchanged with the water (or other heat exchange fluid) can be rejected to the ambient environment via the dry cooler 1706.

As shown in FIG. 17B, the growing facility 1700 can also operate in a free cooling mode of operation. The free cooling mode of operation may be available in geographic locations in which the growing facility is located that have outside ambient conditions that are less than about 15° C. When such external ambient conditions are present, one or more of the heat pumps can be switched off and the dry cooler can use the external decreased temperatures to cool the water (or other heat exchange fluid). Such cooled water (or other heat exchange fluid) can be used to cool the air that is returned from the grow zone 318. The free cooling mode of operation allows certain elements of the heat pump system (such as a condenser) to be switched off. The free cooling mode of operation allows the air to be conditioned to have the desired climate conditions with a reduced energy requirement. This makes the growing facility able to be operated more efficiently and at less cost than traditional of existing facilities.

Figure 18:
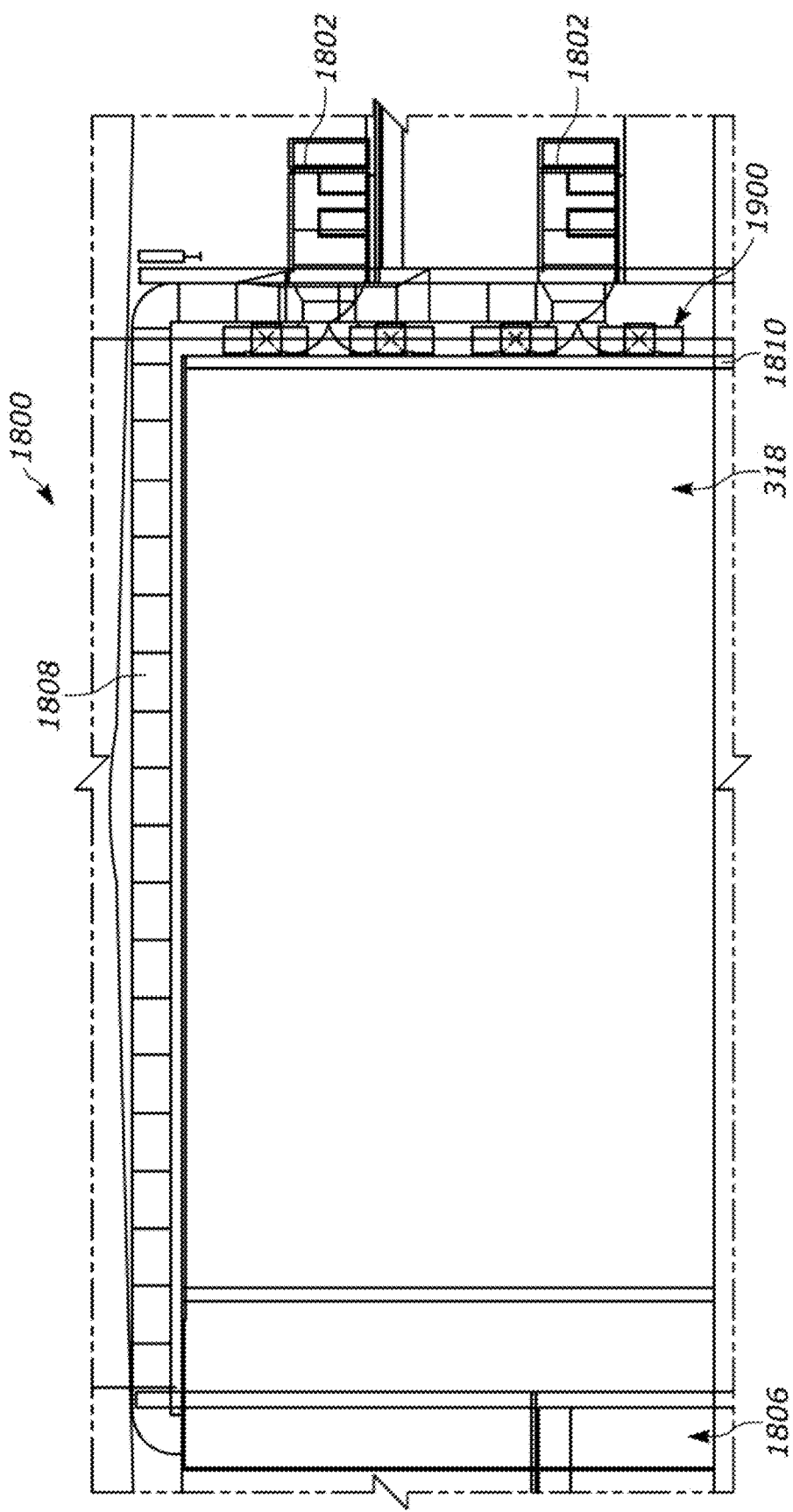
FIG. 18 is a side view of an example grow zone showing aspects of an air handling system.

Referring now to FIG. 18, an example grow zone 318 is shown. A ventilation or air supply network 1800 is shown. The ventilation network 1800 can operate to deliver an airflow to the grow zone 318. As previously described, it is desirable to maintain a laminar airflow in the grow zone 318. It can be further desirable to maintain an airflow with an airspeed and volumetric flow rate that is consistent and stable across certain grow pathways in the grow zone 318. To assist in achieving this result, the ventilation network 1800 can include one or more air handling units 1802 that are positioned outside the grow zone 318 but are fluidly connected to a plenum wall 1810 that is in fluid communication with the grow zone 318 to distribute the airflow. The air handling units 1802 can be connected to the plenum wall 1810 via one or more air distribution paths that can separate and distribute the air in a stable manner, such as a laminar stream of air, to each of the outlets of the plenum wall 1810.

The ventilation network 1800 can also include a return wall 1806 positioned at an opposite end of the grow zone 318 from the plenum wall 1810. The return wall 1806 can collect the air from the grow zone 318 and return the air to the air handling units 1802 via the return ducts 1808.

Figure 19:
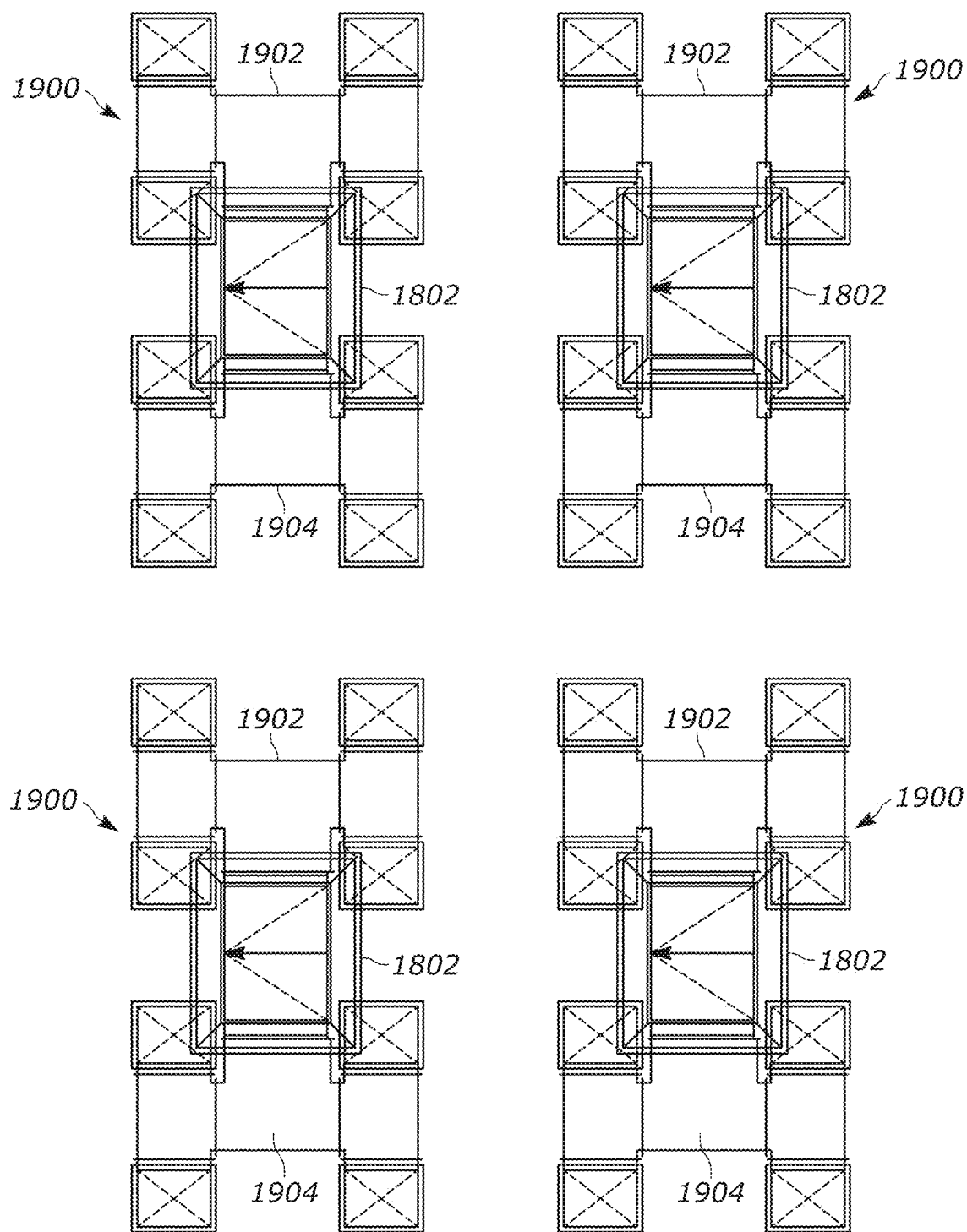
FIG. 19 is an end view of example air handling units and air supply plenums for a grow zone of the present disclosure.
Figure 20:
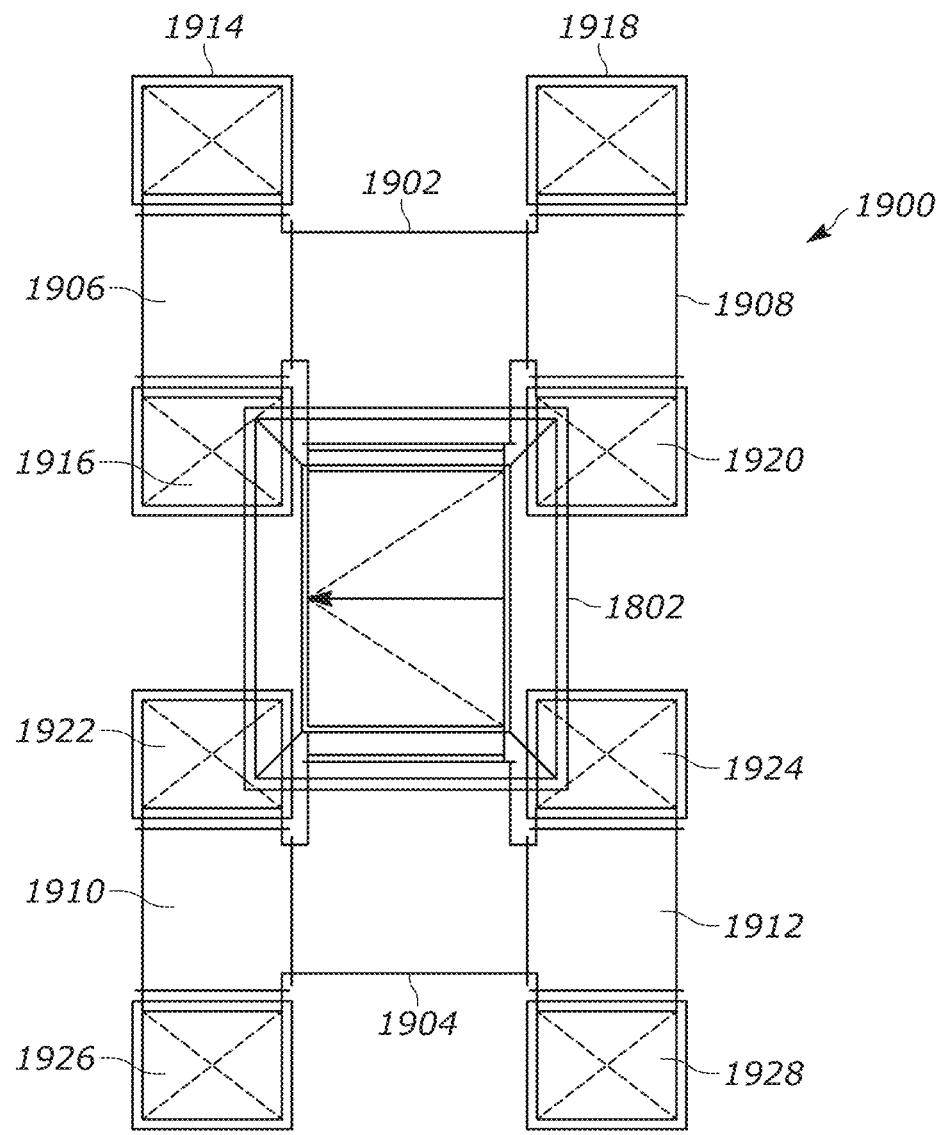
FIG. 20 is an end view of one of the air handling units and air supply plenums of FIG. 19.

Turning now to FIGS. 19 and 20, an improved air distribution system is illustrated. The air distribution system includes an array of air handling units 1802. The array can include any suitable number of air distribution assemblies 1900. In this example, four air distribution assemblies 1900 are arranged in the array as shown. In other examples, other numbers of air distribution assemblies 1900 can be used as may be needed depending on the size of the grow zone 318. Each air distribution assembly 1900 may include an air handling unit 1802 coupled to a first distribution channel 1902 and a second distribution channel 1904. In the example shown, the first distribution channel 1902 and the second distribution channel are positioned vertically and operate to guide air in an upward and downward direction as shown. In other examples, the first separation of the air flow from the air handling unit 1802 can be in a horizontal or other direction.

As can be seen, the first distribution channel 1902 and the second distribution channel 1904 separate the airflow from the air handling unit 1802 in two substantially equal stream of airflow. Each air distribution assembly 1900 can then further separate and divide the air flow from each of the first and second distribution channels 1904 and 1905, into two distribution sub-assemblies 1906, 1908, 1910, and 1912, having substantially equal streams of airflow. Each of the distribution sub-assemblies 1906, 1908, 1910, and 1912 can be further separate the air flow into sub-assemblies 1914, 1916, 1918, 1920, 1922, 1924, 1926, and 1928. Accordingly, the laminar airflow coming out of air handling unit 1802 can be subdivided into 8 equal streams of laminar airflow.

As shown in FIG. 20, an enlarged illustration of the air distribution assembly 1900 is shown. As can be appreciated, each of the air distribution assemblies 1900 in the array of assemblies can include the elements as described below. Only one assembly 1900 is shown and described in detail for the sake of brevity.

The air distribution assembly 1900 can further divide and separate the air flow downstream of the first distribution channel 1902 and the second distribution channel 1904. In the example shown, the assembly 1900 further includes a third channel 1906, a fourth channel 1908, a fifth channel 1910 and a sixth channel 1912. The third channel 1906 can include a first manifold 1914 and a second manifold 1916. The fourth channel 1908 can include a third manifold 1918 and a fourth manifold 1920. The fifth channel 1910 can include a fifth manifold 1922 and a sixth manifold 1926. The sixth channel 1912 can include a seventh manifold 1924 and an eighth manifold 1928. Thus, the air from the air handler can be separated and divided to result in eight manifolds 1914, 1916, 1918, 1920, 1922, 1924, 1926 and 1928.

Each of the manifolds can have the same structure to further divide and separate the air flow to be guided into each of the grow pathways in the grow zone 318. Each of the manifolds can have the structure shown in FIGS. 21-24 and further explained below. For the sake of brevity, the first manifold 1914 is described. It should be appreciated, however, that each of the other manifolds, namely the second manifold 1916, the third manifold 1918, the fourth manifold 1920, the fifth manifold 1922, the sixth manifold 1926, the seventh manifold 1924, and the eighth manifold 1928 can include the same or a similar structure.

Each of the manifolds can be connected to or form part of the plenum wall 1810 previously described. In some examples, the various manifolds (i.e., the eight manifolds) can be positioned adjacent to and/or abutting one another to form the plenum wall 1810. In other examples, other quantities of manifolds can be used to create a plenum wall sized according to the size of the grow zone module.

The manifold 1914 can be rectangular shaped element that can include an upstream side 2104 and a downstream side 2208. The upstream side 2104 can be coupled to the channel 1906 to accept air from the air handling unit 1802 and to further separate and divide the air flow. The upstream side 2104 can include an opening 2102 that can be coupled to the channel 1906. In some examples, the manifold 1914 and the channel 1906 can be made from galvanized sheet metal and formed into the desired shape. The opening 2102 can be coupled to the channel 1906 using suitable connections known in the art. In other examples, the manifold 1914 and the channel 1906 can be made of other materials such as plastics, foams, other alloys and the like.

As shown in the section view of FIG. 22, the manifold can include a diverter 2202 that can divert air flowing into the opening 2102 into lateral directions. The diverter 2202 (see FIG. 24) can be a pyramid shaped projection that projects toward the opening 2102 from the downstream side 2208 of the diverter. In other examples, the diverter 2202 can have other shapes such as cones, ramps, and the like.

The downstream side 2208 is shown in the downstream view of FIG. 23. As can be seen, the downstream side 2208 of the manifold 1914 can include one or more vents 2204 that may be spaced apart from one another to allow the airflow to be further separated and distributed from the entry of the airflow in opening 2102. In the example shown, the manifold 1914 can include four equally sized and spaced vents 2204. The vents 2204 can include a panel that is perforated with an array of holes. When the airflow flows out of the manifold 1914 and into the grow zone 318, a laminar, well-distributed and stable air flow can be produced. The manifold 1914 can include a vent 2204 that is aligned with a grow pathway in the grow zone 318 so that a stable airflow is produced for each grow pathway.

Figure 25:
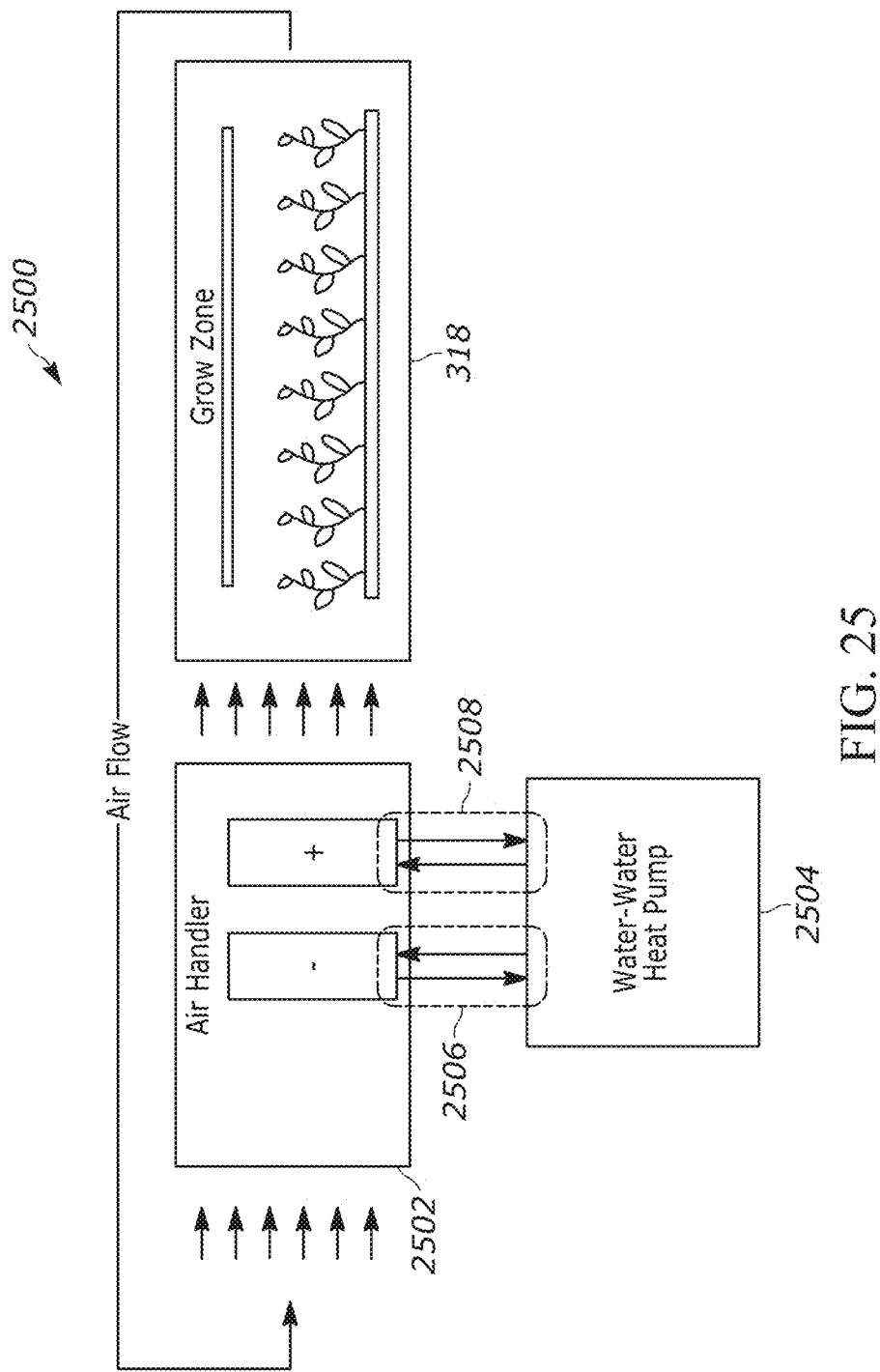
FIG. 25 is a schematic illustration of an environmental control apparatus operating in a first mode of operation to deliver conditioned air flow to a grow room.

Referring now to FIG. 25, the environmental or climate control aspects of a ventilation system 2500 are illustrated. In the example shown, the air handler 2502 can operate to deliver air flow to the grow zone 318. The air flow can have predetermined characteristics or climate parameters including a desired humidity, temperature, flow rate, etc. The air handler 2502 can be coupled to the heat pump 2504. The heat pump 2504 can operate to supply cold water 2506 (via a cold water loop, for example) to the air handler to cool the air and/or remove moisture from the air returning from the grow zone 318. The heat pump 2504 can also operate to supply warm water 2508 (via a warm water loop, for example) to the air handler 2502 to warm the air to a desired temperature after the moisture is removed from the air and before the air is re-supplied to the grow zone 318.

FIG. 25 shows a first mode of operation in which the ventilation system operates as previously described to first cool and dehumidify air that is returned from the grow zone 318. As can be appreciated, the air is warmed and collects moisture from the grow zone 318 as the air travels through the grow zone 318. Thus, the air needs first to be cooled in order to remove the moisture from the air. Before the air is re-supplied to the grow zone 318, the air needs to be re-heated for optimal growing conditions. Thus, the warm water loop from the heat pump 2504 can warm the air in the air handler 2502 before the air is re-supplied to the grow zone 318.

Figure 26:
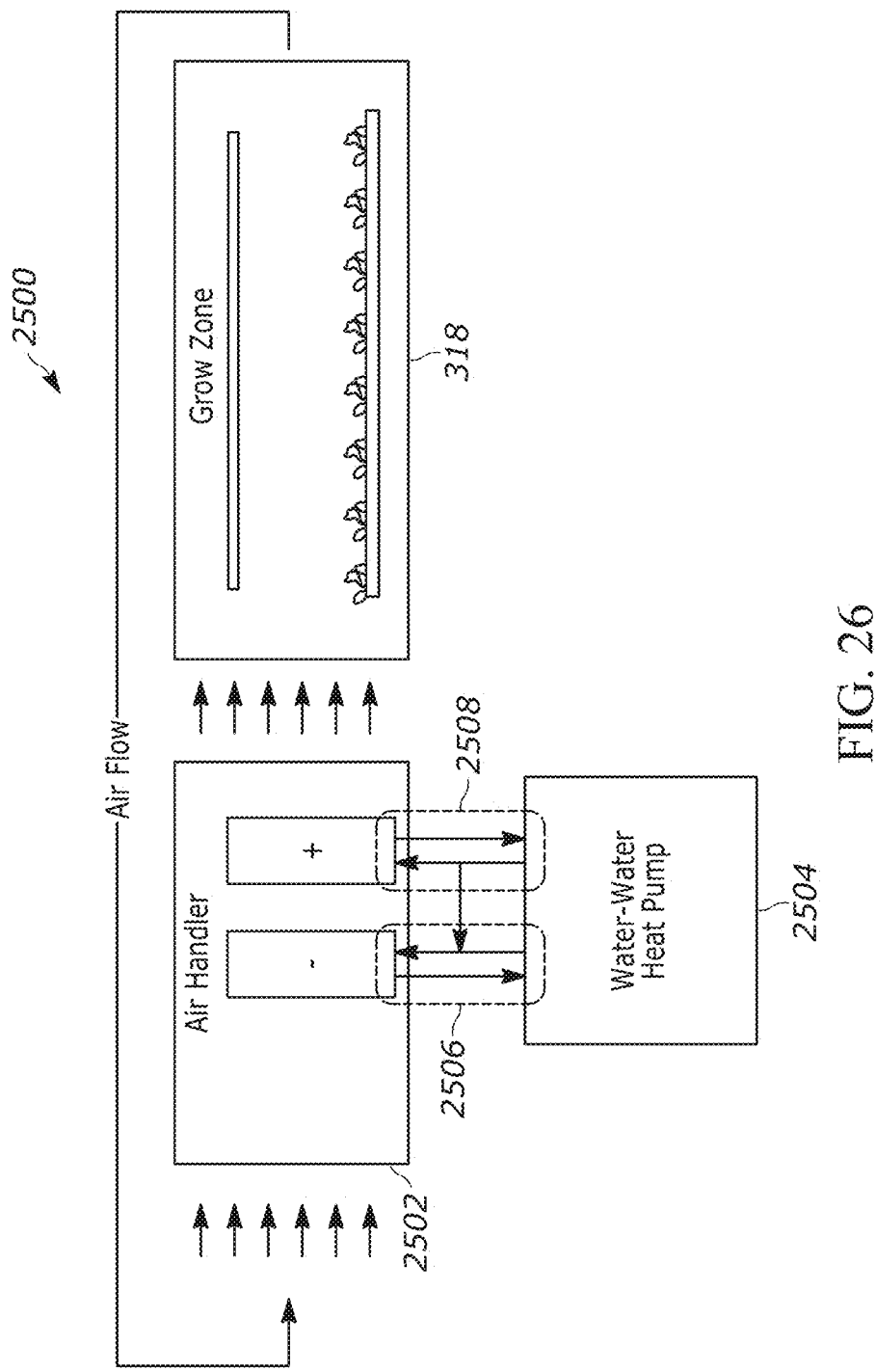
FIG. 26 is a schematic illustration of the environmental control apparatus of FIG. 25 operating in a second mode of operation to deliver conditioned air flow to the grow room.

FIG. 26 illustrates a second mode of operation of the ventilation system 2500. In this example, the plants in the grow zone 318 may be in a stage of development or be of a plant variety in which the plants do not evaporate moisture in an amount that causes the airflow in the grow zone 318 to collect excessive moisture and result in a high humidity content. When the air returns to the air handler, the air may not need to be conditioned to remove excessive amounts of moisture from the air. When the returned air is in such a condition, the warm water from the warm water loop 2508 can be combined with the cold water in the cool water loop 2506 to lower the temperature of the air to a temperature above a dew point. This prevents unwanted dehumidification that would otherwise occur. The air can then be re-supplied to the grow zone 318 without the need to cool the air to condensate the moisture and then re-heat the air before re-supplying the air to the grow zone 318. Thus, energy savings can result by operating the ventilation system 2500 in the second mode of operation shown in FIG. 26.

Figure 27:
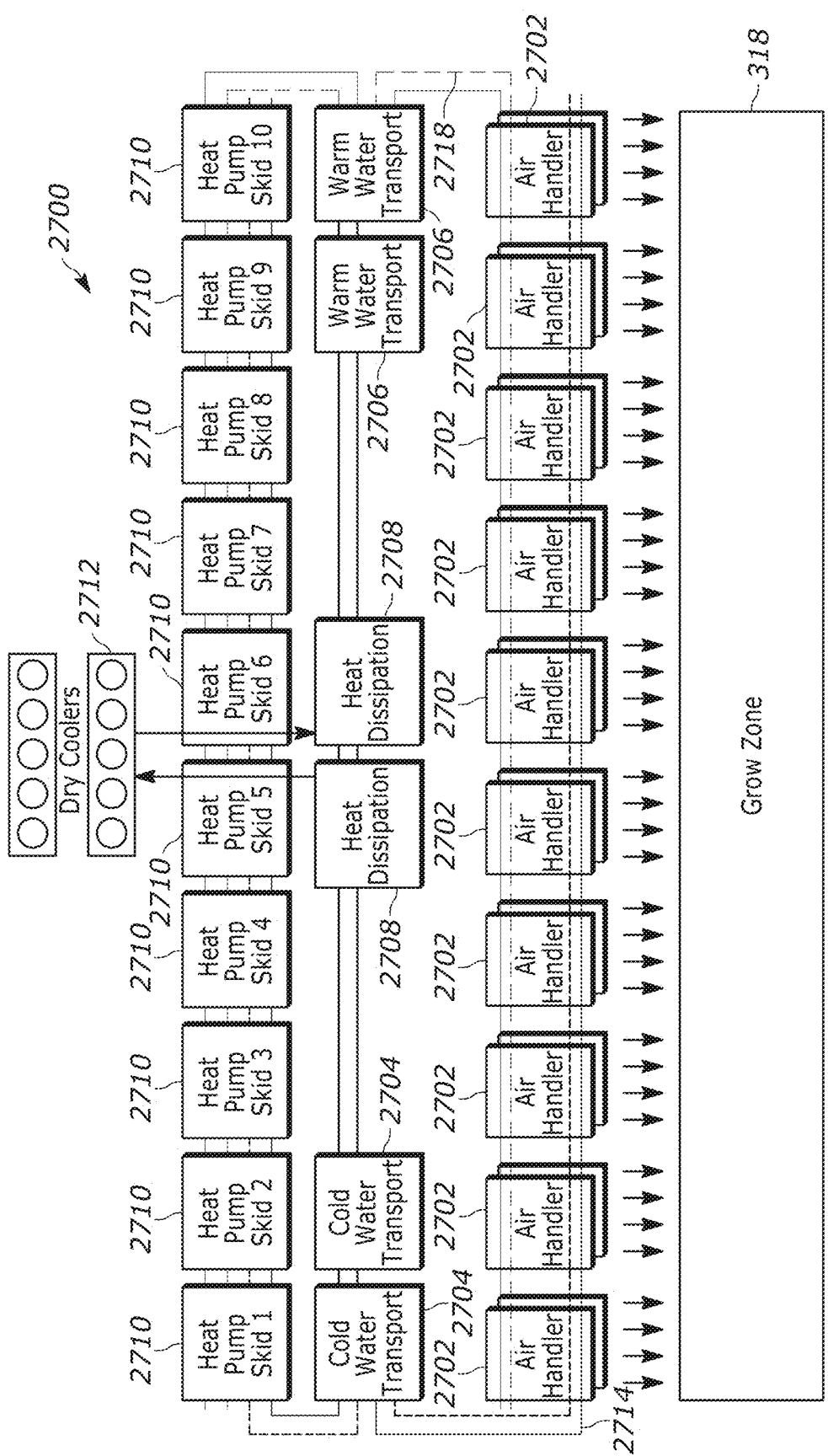
FIG. 27 is schematic illustration of an example environmental control apparatus used to deliver conditioned air flow to a grow room.

FIG. 27 illustrates an example environmental or climate control apparatus 2700. The climate control apparatus 2700 can include similar elements to the ventilation system 2500 previously described and can operate in the first mode of operation and in the second mode of operation. In this example, the climate control apparatus 2700 can include various components that can operate to supply air flow having predetermined characteristics to the grow zone 318. The apparatus 2700 can include one or more air handlers 2702 that can be fluidly connected to the grow zone 318 via the plenum wall and the return wall (not shown).

The air handlers 2702 can be coupled to cold water transport assemblies 2704 and to warm water transport assemblies 2706. The air handlers 2702 can be coupled to the cold water transport assemblies 2704 via cold water loop 2714. The cold water transport assemblies 2704 can provide cold water via the cold water loop 2714 to cool the air when it returns from the grow zone 318 as previously described. The cold water transport assemblies 2704 can include pumps and other suitable piping to guide and supply the cold water to heat exchangers in the air handlers 2702.

Similarly, the warm water transport assemblies 2706 can be coupled to the air handlers 2702 via warm water loop 2718. The warm transport assemblies 2706 can supply warm water via the warm water loop 2718 to warm the air before the air is re-supplied to the grow zone 318. The warm water transport assemblies 2706 can include pumps and other suitable piping to guide and supply the warm water to heat exchangers in the air handlers 2702.

The warm transport assemblies 2706 and the cold water transport assemblies 2704 can also be coupled to the heat dissipation assemblies 2708. The heat dissipation assemblies 2708 can, in turn, be coupled to the dry coolers 2712. The heat dissipation assemblies 2708 can exchange heat from the cold water loop with the external ambient environment via the dry coolers. The heat dissipation assemblies can also exchange heat from the warm water loop with the external environment via the dry coolers.

As further shown, the cold water transport assemblies 2704 can also be coupled to one or more heat pumps 2710. The warm water transport assemblies 2706 can also be coupled to the one or more heat pumps 2710. The heat pumps 2710 can exchange heat between the cold water loop 2714 and the warm water loop 2718.

The air handlers 2702 can be used to collect condensate off the air handlers and send the condensate back to the irrigation system for reuse.

The air handlers 2702, the cold water transport assemblies 2704, the warm water transport assemblies 2706, the heat dissipation assemblies 2708 and/or the heat pumps 2710 can be modular and/or pre-assembled prior to being installed at the indoor growing facility. The various assemblies of the environmental control apparatus 2700 can be used to build different size indoor growing apparatuses. As can be appreciated, the number of components in the climate control apparatus 2700 is dependent on size of the grow zone 318. The various assemblies can be modular in nature to be easily shipped to a building site for a growing facility and then be coupled together according to the needs of the local facility. The components such as the air handlers 2702, the cold water transport assemblies 2704, the warm water transport assemblies 2706, the heat dissipation assemblies 2708 and/or the heat pumps 2710 can be modular in that they are pre-assembled at a manufacturing location and are sized to fit in conventional shipping containers and shipped to the building location of the growing facility.

The climate control apparatus 2700 can be positioned adjacent to the grow zone 318 as shown. The air handlers 2702, the cold water transport assemblies 2704, the warm water transport assemblies 2718, the heat dissipation assemblies 2708, and the heat pumps 2710 can all be positioned inside the indoor growing facility but outside the grow zone 318. This configuration can allow efficient and stable operation of the climate control apparatus 2700. The dry cooler 2712 is positioned outside the indoor growing facility so that it can exchange heat with the ambient environment as previously described.

The ventilation system 2500 is able to capture and retain the condensate collected from the returned humid air. The improved indoor farm system described herein can recycle the collected condensate. The collected water is cleaned and introduced into the irrigation system, where nutrients can be added to then feed the plants in the grow zone 318. The indoor farm system described herein, captures and recycles the unabsorbed nutrient rich water from the ebb and flood irrigation system, as well as the condensate collected from the return air. Thus, the indoor farm system described herein, is able to reduce or minimize the amount of water needed to grow the plants in the grow zone 318 compared to other farming methods and facilities.

Figure 28:
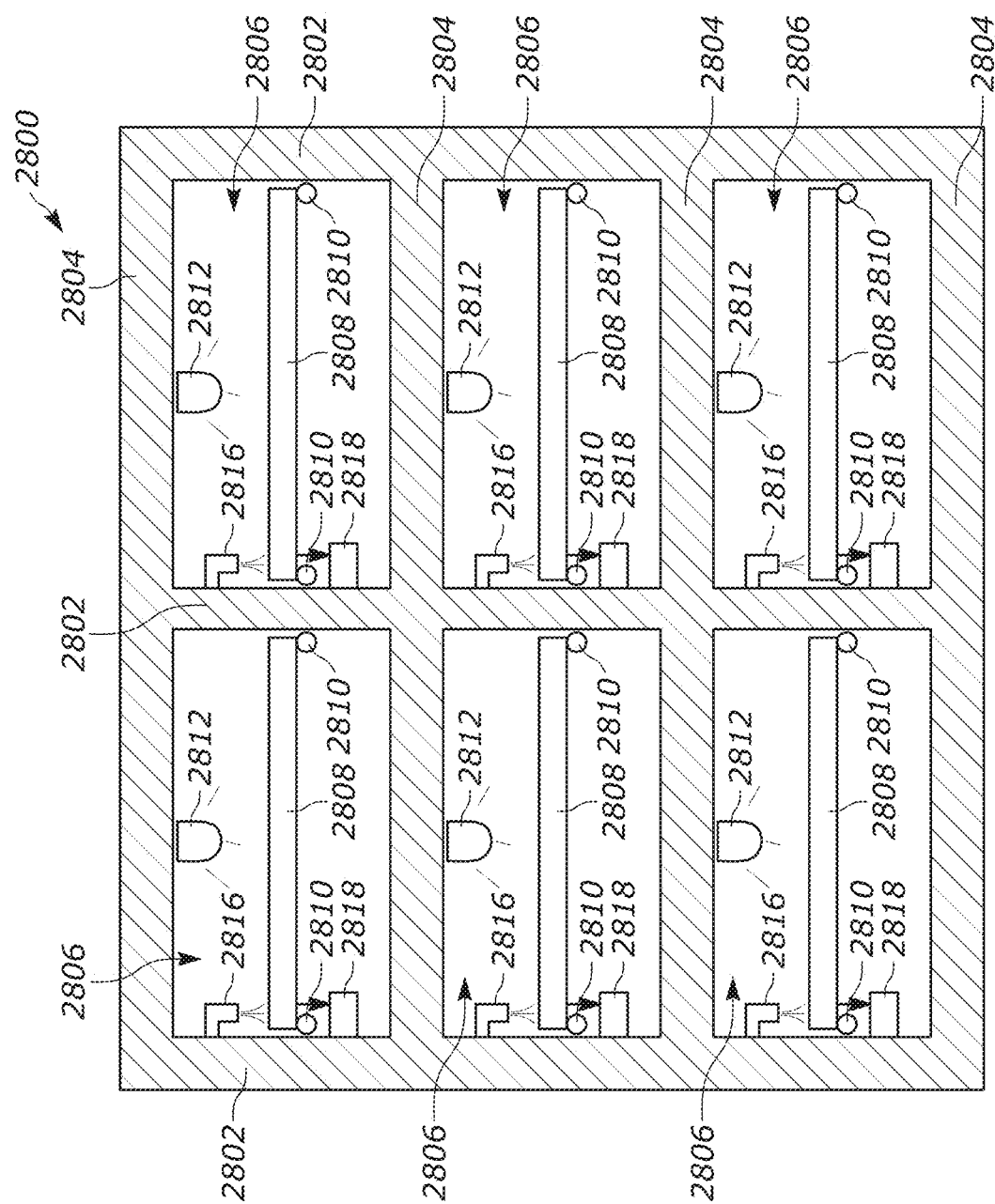
FIG. 28 is a cross-sectional illustration showing aspects of the grow zone structure including lighting and irrigation elements.

Referring now to FIG. 28, a configuration of a growing structure 2800 is further described. In this example, the growing structure 2800 can be positioned in the grow zone 318 and can serve to hold the plants that are growing therein. As shown, the growing structure 2800 can include one or more side barriers 2802 that can separate the columns in the grow zone 318. The growing structure 2800 can also include one or more horizontal barriers 2804 that can separate the rows in the grow zone 318. The side barriers 2802 and/or the horizontal barriers 2804 can be mounted to rack structure as previously described and shown or can be formed as wall members. The barriers 2802, 2804 separate the growing structure 2800 in the various grow pathways 2806 as shown.

Each of the grow pathways 2806 can have a similar configuration and can be sized and configured to support one or more floats or bench assemblies of plants. For example, each grow pathway 2806 can support a bench assembly 2808. The bench assembly 2808 can have the configuration of the bench assembly 900 (FIG. 9) previously described. Each bench assembly 2808 can be supported on a set of rails 2810. The rails 2810 can be a support beam or other structure that may include wheels, conveyors, rollers or other components that allow the bench assembly 2808 to be pushed along the length of the grow pathway 2806 as the plants in the bench assembly 2808 develop and mature.

Each grow pathway 2806 may also include one or more lighting elements 2812. Any suitable lighting elements can be used that can be controlled to emit a suitable light having predetermined characteristics such as intensity, wavelength, duration, etc. The lighting elements 2812 can be suitable LED lights, for example. In other examples, other lighting elements 2812 can be used. The lighting elements 2812 can be positioned above the bench assemblies 2808 to distribute light to the plants in the bench assemblies according to a predetermined lighting schedule.

The growing structure 2800 can also include elements to allow for the irrigation of the plants in the bench assemblies 2808. The plants can be irrigated using an ebb and flood method of irrigation as previously described. To allow such a method of irrigation, the growing structure 2800 can include one or more water dispensers 2816 positioned in each grow pathway 2806. The water dispensers can be connected to an irrigation system that include water sources. The water dispensers 2816 can fill the bench assemblies 2808 with water according to a predetermined irrigation schedule to provide water and nutrients to the plants in the bench assemblies 2808.

Each grow pathway 2806 may also include a gutter 2818 that extends along the grow pathway 2806 at a position under the bench assemblies 2808. The gutter 2818 can be channel or other conduit with an open are facing upwards that can allow the water that drains from the bench assemblies 2808 to be collected. The collected water that drains from the bench assemblies 2808 during irrigation can be recycled through the irrigation system and re-used. Such a method of capturing and recycling the water used during irrigation makes the growing structure and methods of use more efficient than traditional or existing systems and methods.

The water dispensers 2816 can be periodically positioned along the length of each grow pathway 2806. Only one dispenser 2816 is required to fill each bench assembly. However, multiple water dispensers 2816 can also be used for each bench assembly 2808. The water dispensers 2816 can also be individually controlled or controlled in groups relative to the water dispenser's position along the grow pathway 2806. As previously described, the plants in the grow pathway are developing and maturing as they move along the grow pathway toward the plenum wall. The plants in each grow pathway 2806, therefore, may require different irrigation schedules because of the varying stages of development. The individual control or group control of the water dispensers 2816 along each grow pathway 2806 can provide for individualized irrigation schedules at various positions in the grow pathway. The lighting elements 2812 can also be individually controlled or controlled in groups to deliver individualized lighting schedules to the plants at various locations in the grow pathway 2806.

While not shown in FIG. 28, the growing structure 2800 can also include one or more sensors or other information collection components positioned along the grow pathway 2806. In one example, the growing structure 2800 can include temperature sensors, humidity sensors, air flow sensors, carbon dioxide sensors, and other sensors. The sensors can provide information to a centralized control system regarding the growing conditions in the growing structure 2800.

The growing structure 2800 can also include cameras, or imaging devices that can capture photos or images of the plants in the growing structure 2800. The images can be used to automatically determine a size, health, or other characteristics of the plants.

Figure 29:
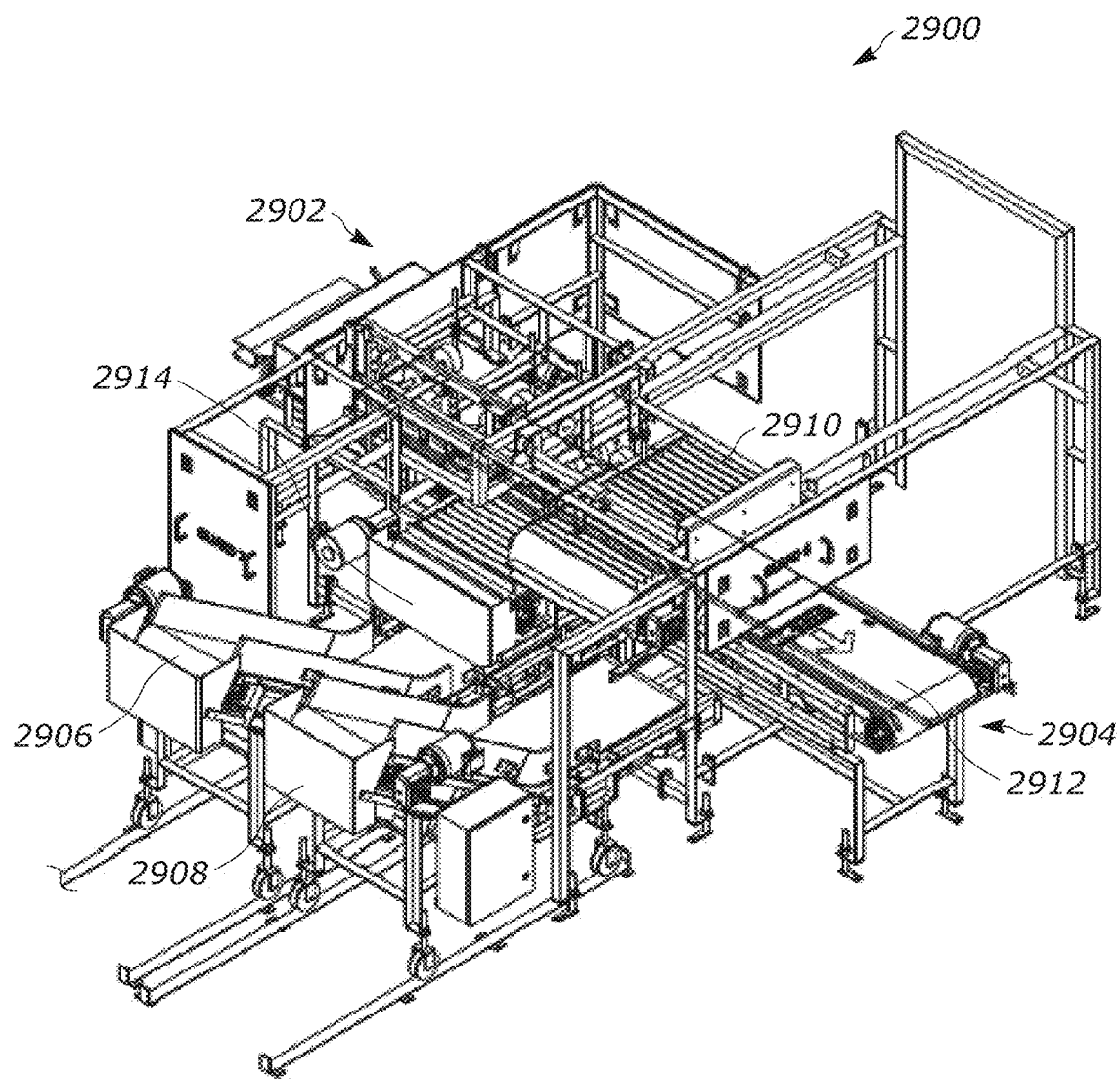
FIG. 29 is an isometric illustration of a float cleaning assembly in accordance with the present disclosure.

Referring now to FIG. 29, an example float scraping apparatus 2900 is shown. The float scraping apparatus 2900 can operate to remove plants, growing medium or other materials from the floats after the floats are unloaded from the grow zone 318. The float can be inserted into the apparatus 2900 at the float input position 2902. The float can be moved along the conveyor 2912 to the float exit position 2904. The float scraping apparatus 2900 can include one or more scraping or removal devices such as blades or wiping belts that can move along surfaces of the float to scrape plants or roots that may be extending above or below the surfaces of the float. In the example shown, the apparatus 2900 can include a lower scraper 2914 that can scrape the roots from the float. The apparatus 2900 can also include an upper scraper 2910 that can remove the plant from the float. The first hopper 2906 can serve to convey the removed materials away from the conveyor 2912 using a suitable conveyor or belt mechanism. The second hopper 2908 can serve to convey the materials removed by the upper scraper away from the conveyor 2912 using a suitable conveyor or belt mechanism.

The example methods and apparatuses described herein may be at least partially embodied in the form of computer-implemented processes and apparatus for practicing those processes and/or the described functionality. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A ventilation system comprising:
an enclosed grow zone comprising a plurality of growing pathways positioned between a return wall and an opposing plenum wall;
a loading elevator positioned within the enclosed grow zone configured to selectively load plants into one growing pathway of the plurality of growing pathways;
at least one air handler configured to supply an air flow to the enclosed grow zone;
at least one heat pump coupled to the at least one air handler and to at least one dry cooler; and
a cold fluid loop and a warm fluid loop each containing a heat exchange fluid, the cold fluid loop and the warm fluid loop each fluidly and separately coupled to the at least one air handler and the at least one heat pump to cool and heat the air flow, respectively, wherein the at least one heat pump is operable in a first mode of operation in which the heat exchange fluid is cooled by the dry cooler and used to cool the air flow to remove moisture before the air handler supplies the air flow to the enclosed grow zone.

2. The ventilation system of claim 1, wherein the at least one air handler and the at least one heat pump are positioned in an outer structure, the outer structure separating the at least one air handler, the at least one heat pump and the grow zone from an ambient external environment.

3. The ventilation system of claim 2, wherein the at least one dry cooler is located outside the outer structure in the ambient external environment.

4. The ventilation system of claim 1, wherein the at least one heat pump is further operable to heat the air flow after moisture is removed before the air flow is supplied to the grow zone.

5. The ventilation system of claim 1, wherein the at least one heat pump is further operable in a second mode of operation in which the heat exchange fluid from the warm fluid loop is mixed with the heat exchange fluid in the cold fluid loop to maintain a temperature of the air flow above a dew point.

6. The ventilation system of claim 5, wherein the air flow is not heated before the air flow is supplied to the grow zone in the second mode of operation.

7. The ventilation system of claim 1, wherein the moisture removed from the air flow in the first mode of operation is supplied to an irrigation system coupled to the grow zone.

8. The ventilation system of claim 1, wherein the first mode of operation operates to remove moisture to maintain a predetermined humidity level in the grow zone.

9. The ventilation system of claim 5, wherein the second mode of operation operates at a lower energy consumption than the first mode of operation.

10. The ventilation system of claim 1, wherein the grow zone is positioned in an indoor growing facility comprising:
an enclosed structure defined by one or more first walls; and
a growing module comprising one or more second walls to enclose the grow zone;
wherein the at least one air handler is positioned inside the enclosed structure and outside the growing module.

11. The ventilation system of claim 10, wherein the one or more first walls separate an interior space from an ambient external environment.

12. The ventilation system of claim 10, wherein the indoor growing facility further comprises a vertical propagation zone positioned adjacent the grow zone in the growing module.

13. The ventilation system of claim 12, wherein:
the propagation zone comprises a first growing region that includes a plurality of rows for holding plants during a first stage of plant growth; and
the grow zone comprises a second growing region that includes a plurality of rows for holding plants during a second stage of plant growth, the first growing region being separated from the second growing region but allowing the air flow to pass from the first growing region to the second growing region.

14. The ventilation system of claim 12, wherein the indoor growing facility further comprises a germination zone positioned proximate the propagation zone in the enclosed structure and outside the growing module.

15. The ventilation system of claim 14, wherein the indoor growing facility further comprises a harvesting zone positioned proximate the grow zone in the enclosed structure and outside the growing module.

16. The ventilation system of claim 14, wherein the indoor growing facility further comprises a transplanting zone configured to receive germinated plants from the germination zone and to provide transplanted plants to the propagation zone.

17. The ventilation system of claim 10, wherein the at least one air handler and the at least one heat pump are located inside the enclosed structure and outside the growing module.

18. The ventilation system of claim 10, wherein the dry cooler is positioned outside the enclosed structure in an ambient environment.

19. The ventilation system of claim 10, wherein the at least one air handler and the at least one heat pump are located inside the enclosed structure and outside the growing module and the dry cooler is positioned outside the enclosed structure in an ambient environment.

20. The ventilation system of claim 13, wherein the at least one air handler is coupled to the plenum wall that distributes the air flow into the first growing region and to the return wall that receives the air flow from the second growing region and the loading elevator is positioned closer to the return wall than to the plenum wall.

* * * * *